US010969750B2

(12) United States Patent
Raghunathan et al.

(10) Patent No.: US 10,969,750 B2
(45) Date of Patent: Apr. 6, 2021

(54) SYSTEM AND METHOD FOR SCHEDULING ELECTRIC GENERATORS USING DECISION DIAGRAMS

(71) Applicant: Mitsubishi Electric Research Laboratories, Inc., Cambridge, MA (US)

(72) Inventors: Arvind Raghunathan, Medford, MA (US); David Bergman, Wethersfield, CT (US); Hiroyuki Hashimoto, Arlington, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 197 days.

(21) Appl. No.: 16/364,471

(22) Filed: Mar. 26, 2019

(65) Prior Publication Data
US 2020/0310369 A1   Oct. 1, 2020

(51) Int. Cl.
G05B 13/04       (2006.01)
G06F 17/11       (2006.01)
H02J 3/40        (2006.01)

(52) U.S. Cl.
CPC ............ G05B 13/042 (2013.01); G06F 17/11 (2013.01); H02J 3/40 (2013.01)

(58) Field of Classification Search
CPC .......... G05B 13/042; G06F 17/11; H02J 3/40
USPC ...................................................... 700/286
See application file for complete search history.

(56) References Cited

U.S. PATENT DOCUMENTS

| 8,949,160 B2* | 2/2015 | Ghosh | G06Q 10/04 706/12 |
| 2007/0168307 A1* | 7/2007 | Floudas | G06Q 10/00 706/19 |
| 2015/0347149 A1* | 12/2015 | Galati | G06F 9/30007 712/201 |

* cited by examiner

Primary Examiner — Mohammad Ali
Assistant Examiner — Joshua T Sanders
(74) Attorney, Agent, or Firm — Gennadiy Vinokur; Hironori Tsukamoto

(57) ABSTRACT

A power generation planning system for controlling on/off sequence of generators according to operational parameters includes an interface to receive the operational parameters including a power demand, state-data of the generators and operational histories of the generators from a power control system, a memory to store an objective function, a mixed-integer programming solver, generator parameters of each the generators and planning modules including a state-space representation module, a variable assignment module, a network flow module and a tight constraint module, a processor to perform the planning modules based on the operational parameters received by the interface. The processor is configured to construct decision diagrams for each of the generators by using the state-space representation module, generate arc-variables representing state-transformations of the generators by assigning binary variables to arcs of the decision, generate network flow constraints to represent feasible operations of each of the generators, generate tight constraints of each of the generators by using the tight constraint module and formulate a mixed-integer problem, solve the mixed-integer problem, by using the mixed-integer programming solver, based on the states-data of the generators, the network flow constraints and the tight constraints, and transmit on/off sequence data of each of the generators obtained from the solved mixed-integer problem to a power control system via the interface.

22 Claims, 11 Drawing Sheets

SYSTEM AND METHOD FOR SCHEDULING ELECTRIC GENERATORS USING DECISION DIAGRAMS

FIELD OF THE INVENTION

The present invention relates generally to System and method for scheduling electric generators, in particular, generating System and method for scheduling electric generators using decision diagrams.

BACKGROUND & PRIOR ART

The UCP involves determining schedules for generators so as to meet a target power demand. As used herein, a schedule specifies for each time instant in a horizon of T time steps—Boolean variables that indicate whether generators should be OFF or ON for a particular time step and continuous variables indicating the power to be produced and the maximum power that can be produced at that time. Generators typically include nuclear, thermal, and renewable power sources. Generators are subject to constraints such as stable operating level, rate of ramping up or down, and the amount of time the generator is ON or OFF, which makes the UCP a difficult combinatorial optimization task, which arises when the operation of N individual generators is scheduled over T time steps, such that the total cost of producing electrical energy that meets the target power demand is minimized, while simultaneously observing the operational constraints of individual generators.

Conventionally, the UCP is typically formulated as a deterministic optimization problem where the outputs of the generators are assumed to be fully dispatchable, e.g., fossil-burned, nuclear, and the future power demand is assumed to be completely known or predictable. Various combinatorial optimization methods are known for solving deterministic UCP, including methods based on dynamic programming, Lagrange relaxation, and mixed integer programming. Despite the plethora of solution approaches there still exists a need to develop effective solution approaches for the UCP.

SUMMARY OF THE INVENTION

It is known that the UCP can be formulated as mixed integer program (MIP). It is also well known that the UCP can be formulated and solved using a state-space representation of the generator's operations and solved using dynamic programming. This invention provides a new formulation of the UCP that leverages the state space representation to formulate the UCP as a MIP.

The present invention discloses a novel representation of the space of the feasible operations of the generator using decision diagrams. Leveraging this decision diagram description, the present invention presents a novel network flow formulation for the UCP. Theoretically, the formulation leads to a stronger relaxation and leads to improved computational performance.

The embodiments of the invention provide a method for formulating a MIP by embedding a decision diagram representing the feasible operations of the generator units in the MIP formulation. The key insight from the embedding is that it allows to tighten the feasible set of operations for the generators by knowing the state of the generator, number of hours on or off, at each time period. This allows to readily incorporate the minimum up time and down time requirements on the generators.

Some embodiments of the present invention are based on realization of a power generation planning system for controlling on/off sequence of generators according to operational parameters. The power generation planning system includes an interface to receive the operational parameters including a power demand, state-data of the generators and operational histories of the generators from a power control system; a memory to store an objective function, a mixed-integer programming solver, generator parameters of each the generators and planning modules including a state-space representation module, a variable assignment module, a network flow module and a tight constraint module; a processor to perform the planning modules based on the operational parameters received by the interface. In this case, the processor is configured to construct decision diagrams for each of the generators according to the generator parameters by using the state-space representation module; generate arc-variables representing state-transformations of the generators by assigning binary variables to arcs of the decision diagrams by using the variable assignment module; generate network flow constraints to represent feasible operations of each of the generators; generate tight constraints of each of the generators by using the tight constraint module and formulate a mixed-integer problem; solve the mixed-integer problem, by using the mixed-integer programming solver, based on the states-data of the generators, the network flow constraints and the tight constraints; and transmit on/off sequence data of each of the generators obtained from the solved mixed-integer problem to a power control system via the interface.

According to embodiments of the present invention, the bounds that are used in the present invention can be substantially tightened based on the knowledge of the number of hours that the generator has been on or off at each time period.

According to another embodiment of the present invention, a power generation planning system for controlling on/off sequence of generators according to operational parameters, includes an interface to receive the operational parameters including as a set of scenarios wherein each scenario includes a demand and reserve pattern, state-data of the generators and operational histories of the generators from a power control system; a memory to store an objective function, a mixed-integer programming solver, generator parameters of each the generators and planning modules including a state-space representation module, a variable assignment module, a network flow module and a tight constraint module; a processor to perform the planning modules based on the operational parameters received by the interface. In this case, the processor is configured to construct decision diagrams for each of the generators according to the generator parameters by using the state-space representation module; generate path variables representing the state transformations of the generators using the variable assignment module and continuous variables for each scenario representing the power production of generators; generate restricted master problem constraints to represent feasible operations of each of the generators including the tight constraint module for each scenario and formulate a mixed-integer problem; solve the mixed-integer problem, by using Branch-and-Price algorithm, based on the states-data of the generators, the restricted master problem constraints including the tight constraints; and transmit on/off sequence data of each of the generators obtained from the solved mixed-integer problem to a power control system via the interface.

The embodiments of the invention allow for a tight representation of the feasible operations of the generators. Further, as some embodiments of the present invention can reduce enormous computing time, the present invention can substantially reduce the computational load and be improvements in computer functionality and improvements in an existing technology regarding computer implementation.

The embodiments of the invention allow for determining generator schedules in the presence of uncertainty in the power demand due to the inclusion of renewable energy sources such as solar and wind. The invention presents a scenario-based two-stage mixed integer stochastic programming formulation that allows for a tight representation of the feasible operations of the generators while including uncertainty in the power demand.

The embodiments of the invention present a Branch-and-Price algorithm for the scheduling of generators that also incorporates the tight representation of the feasible operations of the generators. The algorithm is applicable to UCP with known power demands and uncertain power demands.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

Figure 1:
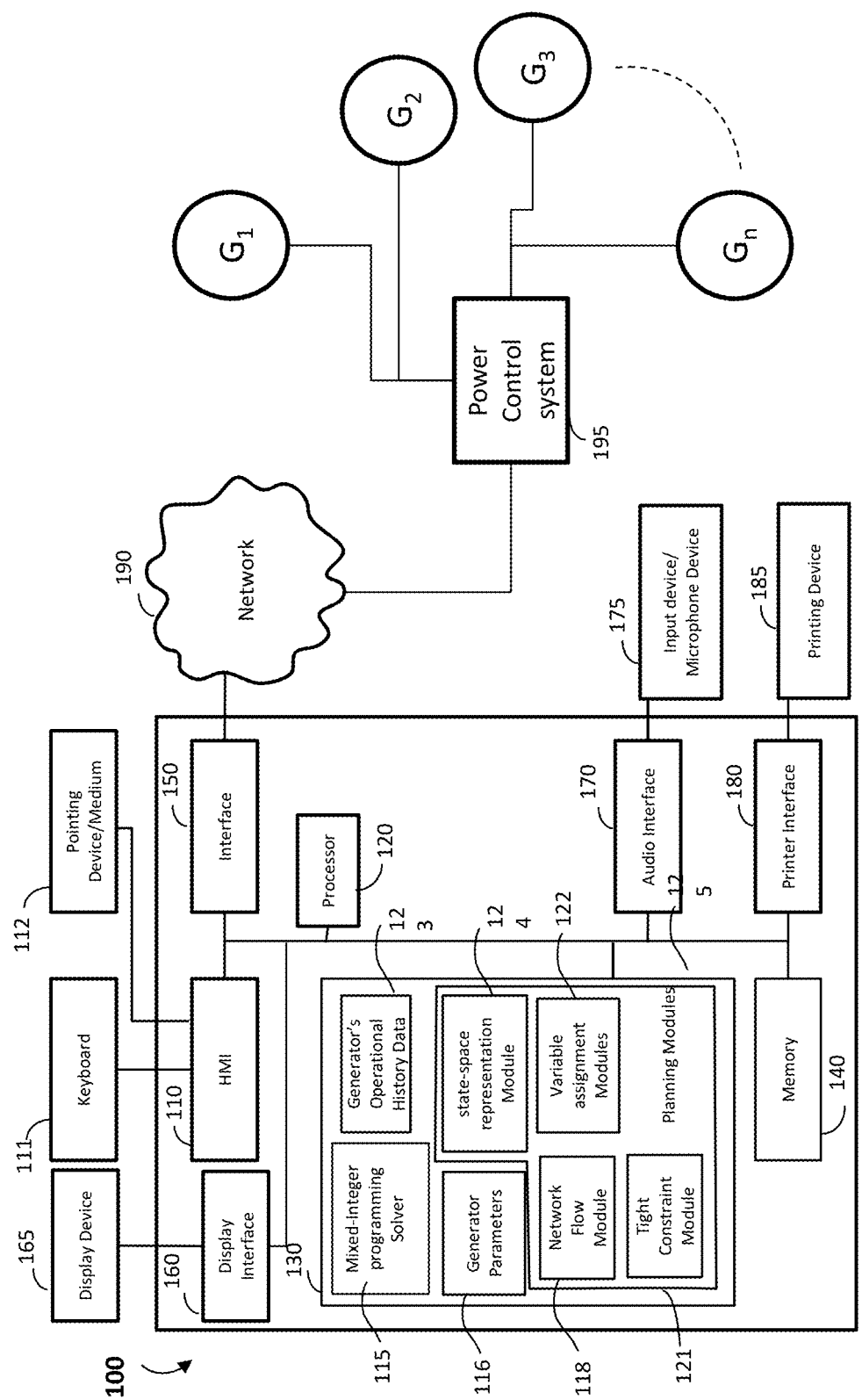
FIG. 1 is a schematic illustrating the system for determining the operations of electric power generators.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

Various embodiments of the present invention are described hereafter with reference to the figures. It would be noted that the figures are not drawn to scale elements of similar structures or functions are represented by like reference numerals throughout the figures. It should be also noted that the figures are only intended to facilitate the description of specific embodiments of the invention. They are not intended as an exhaustive description of the invention or as a limitation on the scope of the invention. In addition, an aspect described in conjunction with a particular embodiment of the invention is not necessarily limited to that embodiment and can be practiced in any other embodiments of the invention.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

FIG. 1 is a schematic illustrating a power generation planning system 100 for determining the operations (operation schedules) of electric power generators so as to meet the demands over a time horizon while minimizing the cost of operations. The system 100 may include input devices 111, 112 to input the generator parameters of each power generator. The input devices 111 and 112 are connected to the system 100 via a human machine interface 110. Display device 165 is connected to display interface 160 to display the input presented to the system and to display the output of the results on the generator operations from the machine. The formulation of the MIP for the UCP consists of a number of steps in which each of the steps are represented by different modules. The operations history module 123 stores the history of the on/off operations and power generation levels of the generators. The generator parameters module 116 stores generator parameters that are relevant to the generator's operations including min up/down time for the generator, limit on the ramp-up and ramp-down of generator during start-up and operation, the cost of operations. The state-space representation module 124 models the set of feasible on/off operations of the generators in the presence of cold start-up costs. The variable assignments module 122 assigns variables for the arcs in the decision diagrams for the generators. The network flow module 118 converts decision diagram representations to a set of equations that model the set of all feasible on/off operations (operation schedules) of the generators. The tight constraint module 121 formulates the feasible power operations of the generators using the variable assignments in the variable assignments module 122 to obtain a tight representation of the feasible power operations of the generator. The mixed integer programming solver module 115 solves the formulation of the UCP that is a result of the different modules. The planning module 125 refers to the collection of modules including variable assignments module 122, tight constraint module 121, The network flow module 118, and state-space representation module 124. The MIP formulation obtained from the modules is stored in memory 140 and solved using the MIP solver 115 on a processor 120. The output of the solution indicates generator operation schedules data that can be communicated to the user using audio interface 170, audio microphone 175 and printer interface 180, printer 185.

Further, the generator operation schedules data obtained from the MIP solver are transmitted, via the interface 150 and the network 190, to the power control system 195, and the received generator operation schedules data are used to control the generators according to the generator operation schedules.

Generator Parameters

The generator parameters 116 associated with the operations of a generator g are:

Pmin$_g$—the minimum power produced by generator when operational

Pmax$_g$—the maximum power produced by generator when operational

SU$_g$—limit on start-up ramp for the generator

SD$_g$—limit on shut-down ramp for the generator

RU$_g$—limit on ramp-up for the generator when it is on for more than one period RD$_g$—limit on ramp-down for the generator when it is on for more than one time period UT$_g$—minimum up time for the generator, number of hours the unit should be operational once it is turned on DT$_g$—minimum down time for the generator, number of hours the unit should be off once it is turned off TC$_g$—the number of hours after the minimum down time period after which the generator incurs cold start-up cost CH$_g$—the start-up cost (hot start-up cost) that is incurred when the unit is turned on prior to (DT$_g$+TC$_g$) time periods CC$_g$—the start-up cost (cold start-up cost) that is incurred if the unit is turned on after (DT$_g$+TC$_g$) time periods C0$_g$—the fixed cost of operating the generator C1$_g$—the linear cost of operating the generator The parameters CH$_g$, CC$_g$, C0$_g$ and C1$_g$ are necessary for the cost of operations and are collectively referred as the cost information of a generator.

The parameters associated with the system operation are:

T={1, . . . , T}—the time period of operation

G—set of generators that are available for power production (available number of generators)

Pdem$_t$—the power demand at time t

Pres$_t$—the reserve power that is demanded of the system at time t

UCP Formulation with Decision Diagram (UCP-DD)

Figure 2:
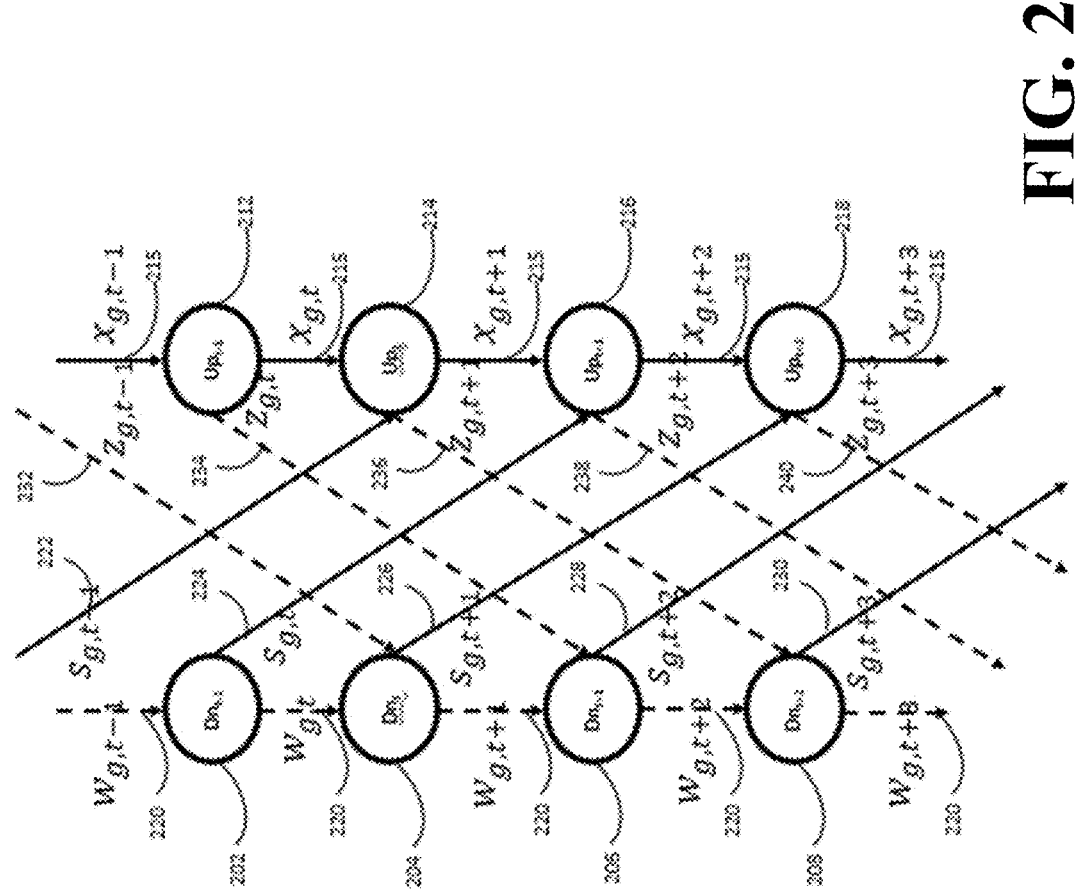
FIG. 2 is the decision diagram representing the convex hull of the feasible on/off operations of a generator according to embodiments of the invention.

FIG. 2 is schematic illustrating the decision diagram representing the feasible operations of a generator according to an embodiment of the invention. The operations represented in the decision diagram satisfy the minimum up/down time for the generators. In this representation, at each time instant t the generator g is in one of two states—Up$_t$ 212, 214, 216, 218 or Dn$_t$ 202, 204, 206, 208. The state Up$_t$ 214 denotes that the generator has been in operation for at least (UT$_g$−1) time periods at the time instant t, where UT$_g$ is the minimum up time for the generator g. In other words, the generator can possibly be turned off at the next time period and such a transition ensures that the generator satisfies the minimum up time for operation. The state Dn$_t$ 204 denotes that the generator has been switched off at least (DT$_g$−1) time periods at time t, where DT$_g$ is the minimum down time for the generator. In other words, the generator can possibly be turned on at the next time period and such a transition ensures that the generator satisfies the minimum down time for operation.

The decision diagram, similar to FIG. 2, for each generator is constructed as follows. The states of the generator g at each instant of time t are $S_{g,t}$={Up$_t$,Dn$_t$}. The state Up$_t$ denotes that the generator has been on for at least (UT$_g$−1) time periods at time t, while Dn$_t$ denotes that the generator has been off for at least (DT$_g$−1) time periods at time t. The arcs in the decision diagram represent the set of feasible transitions and are represented as pairs of states. The feasible arcs are (ST1) (Dn$_t$,Up$_{t+UTg}$)—denoting the generator turning on at time (t+1) and ensuring that it remains on for at least (UT$_{g-1}$) time periods at time (t+UT$_g$)

(ST2) (Up$_t$,Up$_{t+1}$)—denoting the generator continuing to be on at time (t+1) for UT$_g$ or more time periods (ST3) (Up$_t$,Dn$_{t+DTg}$)—denoting the generator turning off at time (t+1) and ensuring that it remains off for at least (DT$_g$−1) time periods at time (t+DT$_g$)

(ST4) (Dn$_t$,Dn$_{t+1}$)—denoting the generator being off at (t+1) for DT$_g$ or more time periods.

Binary variables are associated with the arcs to indicate the state transition that is chosen at each time period. The UCP is formulated using these arc variables that represent state transformation in the decision diagram. The arc variables in the formulation associated with the decision diagram representation in FIG. 2 for each t in T are $s_{g,t} \in \{0,1\}$—indicating the generator is turned on at time t. This is the arc 224 connecting the states Dn$_{t-1}$ and Up$_{t+UTg-1}$.

$x_{g,t} \in \{0,1\}$—indicating the generator is turned on at time t for at least UT$_g$ time periods. This is the arc 215 connecting the states Up$_{t-1}$ and Up$_t$.

$z_{g,t} \in \{0,1\}$—indicating the generator is turned off at time t. This is the arc 234 connecting the states Up$_{t-1}$ and Dn$_{t+DTg-1}$.

$w_{g,t} \in \{0,1\}$—indicating the generator is turned off at time t for at least DT$_g$ time periods. This is the arc 220 connecting the states Up$_{t-1}$ and Up$_t$.

The arc transitioning between state Dn$_{t-1}$ and Up$_{t+UTg-1}$ can also be used to determine how long the generator has been in operation since turning on. For example, the arc 224 connects the states Dn$_{t-1}$ and Up$_{t+UTg-1}$. If this particular arc is chosen then it is clear that the generator g: (i) has been on for 0 time periods at time t; (ii) has been on for 1 time period at time (t+1); and so on so that the generator g is on for (UT$_g$−1) time periods at time (t+UT$_g$−1). Since the representation allows for obtaining additional information such as the number of hours the generator g has been in operation, this can be used to obtain a tight representation of the feasible space of operations for the generator. This is a key realization of the invention.

The continuous variables that are associated with the formulation are:

$p_{g,t}$—continuous variable modeling the excess over the minimum that is produced by generator at time t $Pm_{g,t}$—continuous variable modeling the maximum power that the generator can potentially produce if required at time t towards the reserve requirement.

$Cs_{g,t}$—continuous variable modeling the cold start-up costs at time t

The constraints in the formulation for each generator and each time t are provided below. The variables with indices that are less than 1 are assumed to represent the generator's operational history 123 and are not variables in the optimization.

The operations of the generator that satisfy the minimum up and down time requirements are directly modeled using the constraints for $g \in G$, $t \in T$ as $$x_{g,t-1} + s_{g,t-UTg} = x_{g,t} + z_{g,t} \quad \text{Eq (1)}$$

$$w_{g,t-1} + z_{g,t-DTg} = w_{g,t} + s_{g,t} \quad \text{Eq (2)}$$

Eq (1)-(2) are the network flow constraints modeling the flow balance around the states—$Up_t$, $Dn_t$. The key realization leading to the strength of the relaxation is that the above constraints Eq (1)-(2) are the convex hull of the feasible on/off operations satisfying the minimum up/down time constraints for the generators.

Tight Constraints

The power productions limits on the generator are modeled for $g \in G$, $t \in T$ as $$p_{g,t} + P\min_g(s_{g,t-UTg+1} + \ldots + s_{g,t} + x_{g,t}) \leq Pm_{g,t} \quad \text{Eq (3)}$$

$$Pm_{g,t} \leq (PM_g(UT_g-1)s_{g,t-UTg+1} + \ldots + PM_g(0)s_{g,t} + P\max_g x_{g,t}) + (SD_g - P\max_g)z_{g,t+1} \quad \text{Eq (4)}$$

$$P_{g,t} \leq (P\max_g - P\min_g)(s_{g,t-UTg+1} + \ldots + s_{g,t}) + (P\max_g - P\min_g)x_{g,t} + \Sigma_{j=1}^{DTg-1} \min(0, SD_g + (j-1)RD_g - P\max_g)z_{g,t+j} \quad \text{Eq (4a)}$$

where the $PM_g(j)$ for $j = UT_{g-1}), \ldots, 0$ is defined for generators with $UT_g > 1$ as $$PM_g(j) = P\max_g \text{ for } j = (UT_g-1)$$

$$PM_g(j) = \min(P\max_g, SU_g + jRU_g) \text{ for } j = (UT_g-2), \ldots, 0. \quad \text{Eq. (4b)}$$

For generators with $UT_g = 1$ the parameter is set as
$PM_g(j) = P\max_g$ for $j = 0$.

A key realization in Eq (4) is that the introduced start-up variables allow to tighten the bounds on the maximum power production that improves upon the previous formulations. A key realization in Eq (4a) is that the introduced start-up variables and shutdown variables allows to reduce the bounds on the $p_{g,t}$ based on the possible time of shutdown of the generator. For example, if the $x_{g,t}$ is 1 then the generator has been turned on for more than UTg time periods and suppose that the generator is turned off at time t+1 is $z_{g,t+1}$. If $z_{g,t}1 = 1$ then the right hand side of evaluates to $(SD_g - P\min_g)$. This is consistent with the shutdown ramp on generators. If $z_{g,t+j} = 1$ and so the generator is turned off at time t+j then the right hand side evaluates to $(P\max_g - P\min_g) + \min(0, SD_g + (j-1) RD_g - P\max_g)$. If the argument in the min is negative then right hand side evaluates to $(SD_g + (j-1) RD_g - P\min_g)$.

The ramp-up limit constraints are modeled for $g \in G$, $t \in T$ as $$Pm_{g,t} - p_{g,t-1} \leq RUM_g(UT_g-1)s_{g,t-UTg+1} + \ldots + RUM_g(0)s_{g,t} + (RU_g + P\min_g)x_{g,t} + (SD_g - P\max_g)z_{g,t+1} \quad \text{Eq. (5)}$$

where the $RUM_g(j)$ for $j = UT_{g-1}), \ldots, 0$ is defined for generators with $UT_g > 1$ as
$RUM_g(j) = SU_g$ for $j = 0$ $$RUM_g(j) = (RU_g + P\min_g) \text{ for } j = (UT_g-1), \ldots, 1. \quad \text{Eq (5a)}$$

For generators with $UT_g = 1$ the parameter is set as
$RUM_g(j) = SU_g$ for $j = 0$.

The ramp-down limit constraints are modeled for $g \in G$, $t \in T$ as $$P_{g,t-1} - P_{g,t} \leq RDM_g(UT_{g-1})s_{g,t-UTg+1} + \ldots + RDM_g(0)s_{g,t} + RD_g x_{g,t} + (SD_g - P\min_g)z_{g,t} \quad \text{Eq. (6)}$$

where the $RDM_g(j)$ for $j = (UT_{g-1}), \ldots, 0$ is defined for generators with $UT_g > 1$ as
$RDM_g(j) = 0$ for $j = 0$ $$RDM_g(j) = \min(RD_g, SU_g + (j-1)RU_g) \text{ for } j = (UT_g-1), \ldots, 1. \quad \text{Eq (6a)}$$

For generators with $UT_g = 1$ the parameter is set as
$RUM_g(j) = 0$ for $j = 0$.

A key realization in Eq (6) is that the introduced start-up variables allow to tighten the bounds on the ramp-down limit that improves upon the previous formulations.

The cold start-up costs associated with the generator are modeled as $$Cs_{g,t} \geq (CH_g - CC_g)(s_{g,t} - z_{g,t-DT} - \ldots - z_{g,t-DT-TC+1}) \quad \text{Eq (7)}$$

The demand and reserve satisfaction constraints are imposed for $t \in T$ as $$\Sigma_{g \in G}(p_{g,t} + P\min_g(s_{g,t-UTg+1} + \ldots + s_{g,t} + x_{g,t})) \geq P\text{dem}_t \quad \text{Eq (8)}$$

$$\Sigma_{g \in G} Pm_{g,t} \geq \text{Pres}_t \quad \text{Eq (9)}$$

The start-up variables are associated with the costs of operation $\eta_{g,t}$ as follows $$\eta_{g,t} = CH_g + \min(T - t1, +UT_g)(C0_g + C1_g P\min_g)$$

Once the generator is turned on since it is required to be on for at least $UT_g$ periods the fixed costs of operation with the generator are $C0_g + UT_g(C1_g P\min_g)$. The minimum is applied to ensure that the operational costs associated with the generator are only for the time periods within the horizon T. Since the hot start cost is smaller than the cold start cost, switching on the generator requires that at least a cost of $CH_g$ is incurred.

The optimization problem for the UCP can be formulated as

Min $\Sigma_{g \in G} \Sigma_{t \in T} (\eta_{g,t} s_{g,t} + (C0_g + C1_g \, P\min_g) \, x_{g,t} + Cs_{g,t} + C1_g \, p_{g,t})$ s.t. Eq (1) Eq (9)

$s_{g,t}, x_{g,t}, w_{g,t}, z_{g,t} \in \{0,1\}$ $p_{g,t}, Pm_{g,t}, Cs_{g,t} \geq 0.$      Eq (UCP-1)

The objective function in Eq (UCP-1) models the cost of operating the generators. In the above formulation in Eq (UCP-1) the constraints Eq (1)-Eq (9) are the network flow constraints and tight constraints and are a key realization of the invention.

Figure 4:
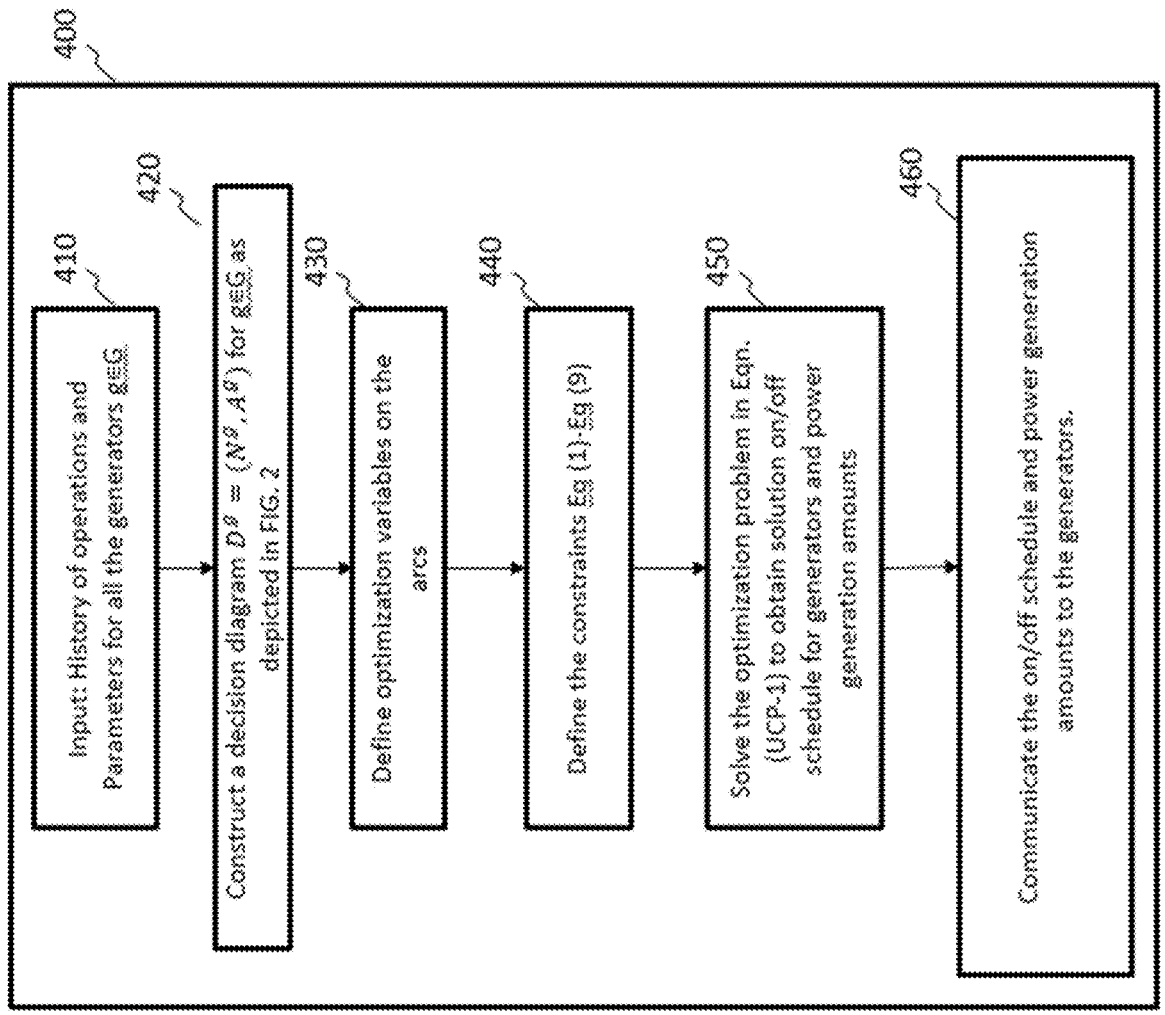
FIG. 4 is the flowchart describes the steps involved in the method for obtaining the power generation schedules for generators according to embodiments of the invention.

FIG. 4 is a schematic for describing the steps involved in the determination on/off and power generation schedules for the generators according to the formulation described in Eq (UCP-1). The method takes as input 410 the generators history of operations and parameters. The decision diagram for each generator 420 is constructed according to the description provided herein. The optimization variables 430 and the constraints 440 are defined as described herein. The formulation Eq. (UCP-1) is solved 450 and the obtained on/off schedule and power generation schedules are communicated to the generators 460.

UCP Formulation with Decision Diagram including Cold Start Costs (UCP-DDwCS)

Figure 3:
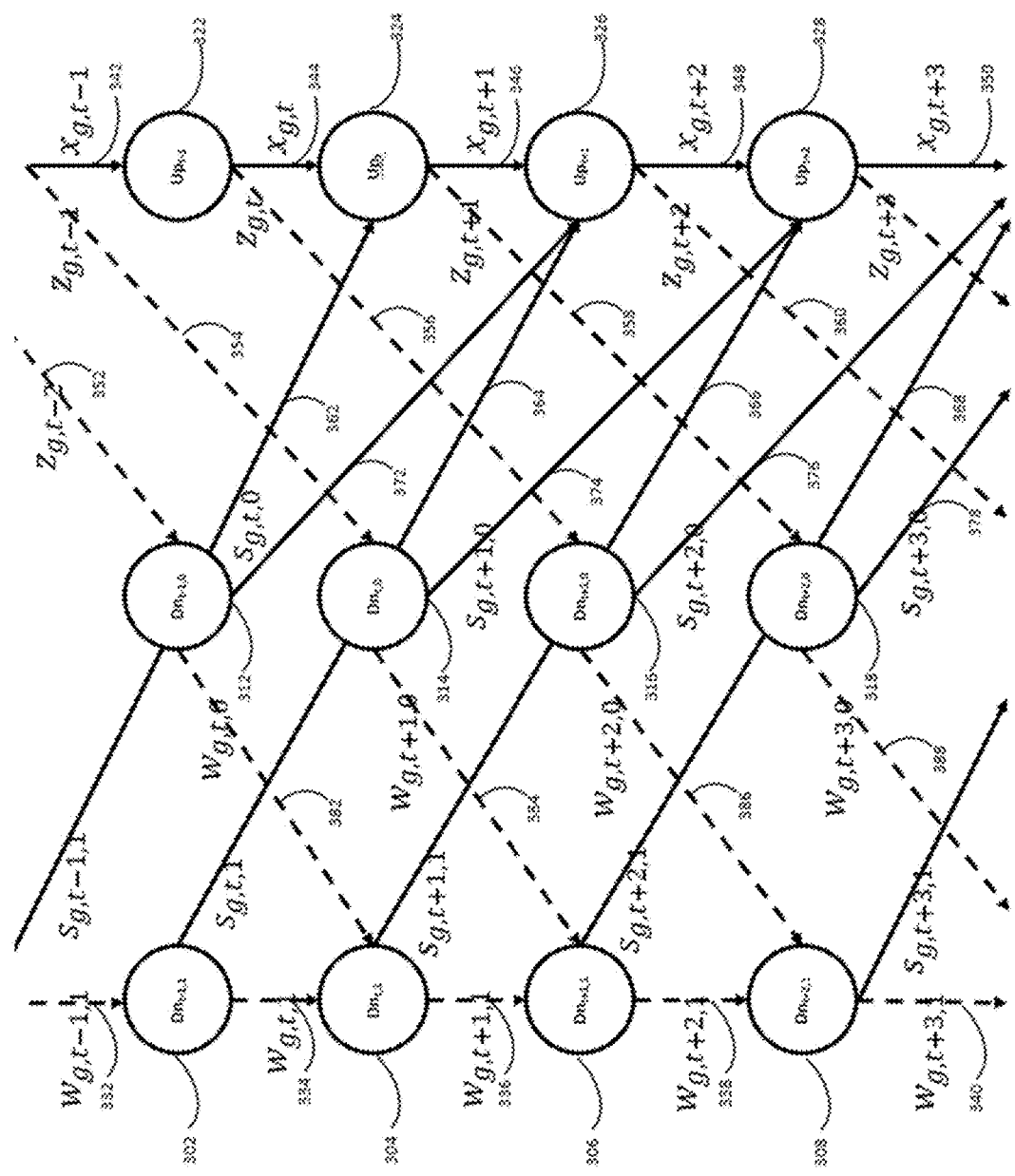
FIG. 3 is the decision diagram representing the convex hull of the feasible on/off operations of a generator in the presence of cold start-up costs according to embodiments of the invention.

FIG. 3 is schematic illustrating the decision diagram including cold start costs representing the feasible operations of a generator according to an embodiment of the invention. The operations represented in the decision diagram satisfy the minimum up/down time for the generators and include additional information that can capture the cold start costs. In this representation, at each time instant t the generator is in one of states—$Up_t$ 324, $Dn_{t,0}$ 314, . . . , $Dn_{t,TCg-1}$ 1304. The state $Up_t$ 324 denotes that the generator g has been in operation for at least $(UT_g-1)$ time periods. In other words, the generator g can possibly be turned off at the next time period and such a transition ensures that the generator g satisfies the minimum up time for operation. The state $Dn_{t,k}$ denotes that the generator g has been switched off for at least $(DT_g-1+k)$ time periods. In other words, the generator g can possibly be turned on at the next time period and such a transition ensures that the generator satisfies the minimum down time for operation. The state $Dn_{t,k}$ allows to track how long the generator has been turned off beyond the minimum down time. In particular, the state $Dn_{t,TCg-1}$ 1304 denotes that the generator has been off for $(DT_g+TC_{g-1})$ time periods and of turned on in the next time period or later the generator operation will incur the cold start-up costs. The decision diagram with expanded set of Dn state nodes allows to associate the additional cold start costs that are associated with a generator when it is started after $(DT_g+TC_g)$ time periods of non-operation.

The decision diagram, similar to FIG. 3, can be constructed for each generator as follows. The states for the generator g at each instant of time t are expanded to $S_{g,t}=\{Up_t, Dn_{t,0}, \ldots, Dn_{t,TCg-1}\}$. The state $Up_t$ denotes that the generator has been on for at least $(UT_g-1)$ time periods at time t, while $Dn_{t,k}$ for $0 \le k \le (TC_g-2)$ denotes that the generator has been off for exactly $(DT_g-1+k)$ time periods at time t. The state $Dn_{t,TCg-1}$ denotes that the generator g has been off for at least $(DT_g+TC_g-1)$ time periods at time t. The state transitions for this representation are (EST1) $(Dn_{t,1}, Up_{t+UTg})$ for $0 \le l \le (TC_g-1)$—denoting the generator turning on at time (t+1) from state $Dn_{t,1}$ and ensuring that it remains on for at least $(UT_g-1)$ time periods at time $(t+UT_g)$ (EST2) $(Up_t, Up_{t+1})$—denoting the generator continuing to be on at time (t+1) for $UT_g$ or more time periods (EST3) $(Up_t, Dn_{t+DTg,0})$—denoting the generator turning off at time (t+1) and ensuring that it remains off for at least $(DT_g-1)$ time periods at time $(t+DT_g)$ (EST4) $(Dn_{t,1}, DN_{t+1,1+1})$ for $0 \le l \le (TC_g-2)$—denoting the generator being off at (t+1) for $(UT_g+1+1)$ time periods.

(EST5) $(Dn_{t,1}, Dn_{t,1})$ for $1=(TC_g-1)$—denoting the generator being off at (t+1) for $(DT_g+TC_g)$ or more time periods.

Binary variables are associated with the arcs to indicate the state transition that is chosen at each time period. The UCP is formulated using these arc variables that represent state transformation in the decision diagram.

The arc variables in the formulation associated with the state-space representation in FIG. 3 for each tin T are $s_{g,t,k} \in \{0,1\}$—indicating the generator is turned on at time t from state $Up_{t,k}$. This is the arc 372, 364 connecting the states $Dn_{t-1}$ and $Up_{t+UTg-1}$.

$x_{g,t} \in \{0,1\}$—indicating the generator is turned on at time t for at least $UT_g$ time periods. This is the arc 344 connecting the states $Up_{t-t}$ and $Up_t$.

$z_{g,t,k} \in \{0,1\}$—indicating the generator is turned off at time t. This is the arc 344 connecting the states $Up_{t-1}$ and $Dn_{t+DTg-1}$.

$w_{g,t,k} \in \{0,1\}$—indicating the generator continues to be turned off beyond the minimum down time $DT_g$ time periods and is in state $Dn_{t,min(TCg-1,k+1)}$ at time t. This is the arc 334 connecting the states $Dn_{t-1,TCg-1}$ and $Dn_{t,TCg-1}$.

The arc transitioning between state $Dn_{t-t,k}$ and $Up_{t+UTg-1}$ can also be used to determine how long the generator has been in operation since turning on. For example, the arc 364 connects the states $Dn_{t-1,1}$ and $Up_{t+UTg-1}$. The arc 372 connects the states $Dn_{t-1,0}$ and $Up_{t+UTg-1}$. If this particular arc is chosen then it is clear that the generator g: (i) has been on for 0 time periods at time t; (ii) has been on for 1 time period at time (t+1); and so on so that the generator g is on for $(UT_g-1)$ time periods at time $(t+UT_{g-1})$. Since the representation allows for obtaining additional information such as the number of hours the generator g has been in operation, this can be used to obtain a tight representation of the feasible space of operations for the generator.

In addition, the arc transitioning between state $Dn_{t-DTg+1,k}$ and $Up_{t+1}$ can be associated with different start-up costs. For instance, the arcs $(Dn_{t-DTg+1,k}, Up_{t+1})$ with $0 \le k \le (TC_g-2)$ are associated with hot start-up costs. On the other hand, the arc $(Dn_{t-DTg+1,TCg-t}, Up_{t+1})$ is associated with the higher cold start-up costs. A key realization is that this representation is the convex hull of the feasible schedules of the generator satisfying the minimum up and down requirements including the start-up costs.

The continuous variables that are associated with the formulation are:

$p_{g,t}$—continuous variable modeling the excess over the minimum that is produced by generator at time t $Pm_{g,t}$—continuous variable modeling the maximum power that the generator can potentially produce if required at time t The constraints in the formulation for each generator and each time t are provided below. The variables with indices that are less than 1 are assumed to represent the generator's operational history and are not variables in the optimization.

The operations of the generator that satisfy the minimum up and down time requirements are directly modeled using the constraints for $g \in G$, $t \in T$ as $$x_{g,t-1} + \Sigma_{k=0}^{TCg-1} s_{g,t-UTg,k} = x_{g,t} + z_{g,t} \qquad \text{Eq (10)}$$

$$z_{g,t-DTg} = w_{g,t,0} + s_{g,0,t} \qquad \text{Eq (11a)}$$

$$w_{g,t-1,k-1} = w_{g,t,k} + s_{g,t,k} \text{ for } k=1,\ldots,(TC_g-2) \qquad \text{Eq (11b)}$$

$$w_{g,t-1,TCg-1} + w_{g,t-1,TCg-2} = w_{g,t,TCg-1} + s_{g,t,TCg-1} \qquad \text{Eq (11c)}$$

Eq (10)-(11) are the network flow constraints modeling the flow balance around the states—$Up_t$, $Dn_{t,0}$, . . . , $Dn_{t,TCg-1}$. The key realization leading to the strength of the relaxation is that the above constraints Eq (10)-(11) are the convex hull of the feasible on/off schedules for the generators including the cold start-up costs for the generator.

Tight Constraints

The power productions limits on the generator are modeled for $g \in G$, $t \in T$ as $$p_{g,t} + P \min_g(\Sigma_{k=0}^{TCg-1}(s_{g,t-UTg+1,k} + \ldots + s_{g,t,k}) + x_{g,t})$$
$$\le Pm_{g,t} \qquad \text{Eq (12)}$$

$$Pm_{g,t} \le (\Sigma_{k=0}^{TCg-1}(PM_g(UT_g-1)s_{g,t-UTg+1,k}+ \ldots +PM_g(0)s_{g,t,k})+P\max_g x_{g,t}+(SD_g-P\max_g)z_{g,t+1} \quad \text{Eq. (13)}$$

$$p_{g,t} \le (P\max_g - P\min_g)\Sigma_{k=1}^{TCg-1}(s_{g,t-UTg+1,k}+ \ldots +s_{g,t,k})+(P\max_g - P\min_g)x_{g,t}+\Sigma_{j=1}^{DTg-1}\min(0, SD_g+(j-1)RD_g-P\max_g)z_{g,t+j} \quad \text{Eq (13a)}$$

where the $PM_g(j)$ for $j=(UT_g-1), \ldots, 0$ is defined for generators as in Eq. (4b).

A key realization in Eq (13) is that the introduced start-up variables allow to tighten the bounds on the maximum power production that improves upon the previous formulations. A key realization in Eq (13a) is that the introduced start-up variables and shutdown variables allows to reduce the bounds on the $p_{g,t}$ based on the possible time of shutdown of the generator. For example, if the $x_{g,t}$ is 1 then the generator has been turned on for more than $UT_g$ time periods and suppose that the generator is turned off at time t+1 is $z_{g,t+1}$. If $z_{g,t+1}=1$ then the right hand side of evaluates to $(SD_g-P\min_g)$. This is consistent with the shutdown ramp on generators. If $z_{g,t+j}=1$ and so the generator is turned off at time t+j then the right hand side evaluates to $(P\max_g - P\min_g)+\min(0, SD_g+(j-1) RD_g-P\max_g)$. If the argument in the min is negative then right hand side evaluates to $(SD_g+(j-1) RD_g-P\min_g)$.

The ramp-up limit constraints are modeled for $g \in G$, $t \in T$ as $$Pm_{g,t}-p_{g,t-1} \le \Sigma_{k=0}^{TCg-1}(RUM_g(UT_g-1)s_{g,t-UTg+1}+ \ldots +RUM_g(0)s_{g,t,k})+(RU_g+P\min_g)x_{g,t}+(SD_g-P\max_g)z_{g,t+1} \quad \text{Eq (14)}$$

where the $RUM_g(j)$ for $j=(UT_g-1), \ldots 0$ is defined for generators as in Eq (5a).

The ramp-down limit constraints are modeled for $g \in G$, $t \in T$ as $$p_{g,t-1}-p_{g,t} \le \Sigma_{k=0}^{TCg-1}(RDM_g(UT_g-1)s_{g,t-UTg+1,k}+ \ldots +RDM_g(0)s_{g,t,k})+RD_g x_{g,t}+(SD_g-P\min_g)z_{g,t} \quad \text{Eq (15)}$$

where the $RDM_g(j)$ for $j=(UT_{g-1}), \ldots, 0$ is defined for generators as in Eq (6a).

A key realization in Eq (15) is that the introduced start-up variables allow to tighten the bounds on the ramp-down limit that improves upon the previous formulations.

The demand and reserve satisfaction constraints are imposed for $t \in T$ as $$\Sigma_{g \in G}(p_{g,t}+P\min_g(\Sigma_{k=0}^{TCg-1}(s_{g,t-UTg+1,k}+ \ldots +s_{g,t,k})+x_{g,t})) \ge P\text{dem}_t \quad \text{Eq (16)}$$

$$\Sigma_{g \in G}Pm_{g,t} \ge Pres_t \quad \text{Eq (17)}$$

The start-up variables are associated with the costs of operation $\eta_{g,t,k}$ as follows $$\eta_{g,t,k}=CH_g+\min(T-t+1,UT_g)(C0_g+C1_g P\min_g) \text{ for } k=0, \ldots, (TC_g-2)$$

$$\eta_{g,t,k}=CC_g+\min(T-t+1,UT_g)(C0_g+C1_g P\min_g) \text{ for } k=(TC_g-1)$$

Once the generator is turned on since it is required to be on for at least $UT_g$ periods the fixed costs of operation with the generator are $C0_g+UT_g(C1_g P\min_g)$. The minimum is applied to ensure that the operational costs associated with the generator are only for the time periods within the horizon T.

The optimization problem for the UCP to determine the optimal schedules for the generators can be formulated as $$\text{Min } \Sigma_{g \in G}\Sigma_{t \in T}(\Sigma_{k=0}^{TCg-1}\eta_{g,t,k}s_{g,t,k}+(C0_g+C1_g P\min_g)x_{g,t}+C1_g p_{g,t})$$

s.t. Eq (10)-Eq (17)

$$s_{g,t,k},x_{g,t},w_{g,t,k},z_{g,t} \in \{0,1\}$$

$$p_{g,t},Pm_{g,t} \ge 0. \quad \text{Eq (UCP-2)}$$

The objective function in Eq (UCP-2) models the cost of operating the generators. The constraints in Eq (10)-(17) in the above formulation in Eq(UCP-2) are the network flow constraints and tight constraints.

Figure 5:
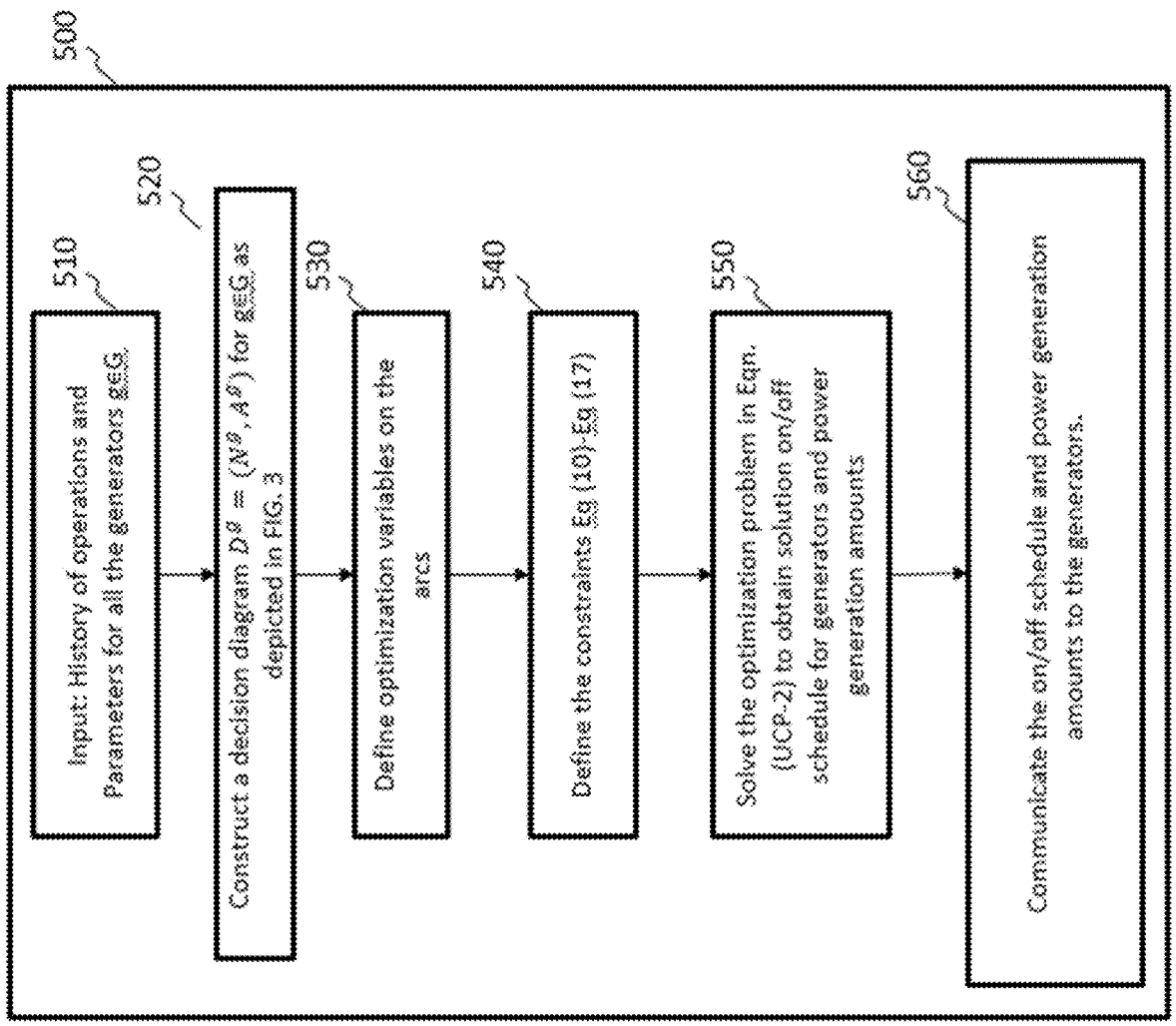
FIG. 5 is the flowchart describes the steps involved in the method for obtaining the power generation schedules for generators according to embodiments of the invention.

FIG. 5 is a schematic for describing the steps involved in the determination on/off and power generation schedules for the generators according to the formulation described in Eq (UCP-2). The method takes as input 510 the generators history of operations and parameters. The decision diagram for each generator 520 is constructed according to the description provided herein. The optimization variables 530 and the constraints 540 are defined as described herein. The formulation Eq. (UCP-1) is solved 550 and the obtained on/off schedule and power generation schedules are communicated to the generators 560.

Branch-and-Price Formulation

In another embodiment of the invention, a so-called Exponential Formulation (EF) may be used to find the optimal scheduling of the generators. The decision diagram representation of the generator's operations consists of paths that start from the initial state of the generators and follows the sequence of arcs in the decision diagram leading up to the end of the time horizon of operations.

Denote by $\mathcal{P}^g$ the set of paths in the decision diagram that is associated with generator $g \in G$. In FIG. 2 if the initial state is $Dn_{t-1}$ then an example of a path in the decision diagram is $(Dn_{t-1}, Dn_t, Up_{t+2})$. Note that the path satisfies the feasible state transitions (ST1)-(ST4). In FIG. 3 if the initial state is $Dn_{t-1,0}$ then an example of a path in the decision diagram is $(Dn_{t-1,0}, Dn_{t,1}, Up_{t+2})$.

Denote by $On_g=\{ON_0, \ldots, ON_{UTg-1}\}$, $Off_g=\{OFF_{DTg+TCg-1}, OFF_{DTg+TCg-2}, \ldots, OFF_{DTg-1}, \ldots, OFF_0\}$ and $OnOff_g=On_g \cup Off_\tau$ for $\tau \le (DT_g+TC_g-2)$ represents that the generator has been turned off for $(DT_g+TC_g-2)$ time periods; $OFF_\tau$ for $\tau=(DT_g+TC_{g-1})$ represents that the generator has been turned off for $(DT_g+TC_{g-1})$ or more time periods; $ON_\tau$ for $\tau \le (UT_g-2)$ represents that the generator has been turned on for $(UT_g-2)$ time periods; and $ON_\tau$ for $\tau=(UT_g-1)$ represents that the generator has been turned on for $(UT_g-1)$ or more time periods.

Given a path $p \in \mathcal{P}^g$, defining a sequence of Up/Dn states for the generator g on that path p a sequence of states $s(p)=\{s_0, s_1, \ldots, s_T\}$ for each time instant in the horizon starting with a given initial state $s_0$ and $s_t \in OnOff_g$. For example, the path $(Dn_{t-1,0}, Dn_{t,1}, Up_{t+2})$ in the decision diagram, of UCP-DDwCS formulation, of FIG. 3 is represented using the sequence of states in $OnOff_g$ as $(Off_1, Off_2, On_0, On_1)$ indicating that generator is off for 1 time period at time (t−1) which is the initial state; the generator is off for 2 time periods at time t; the generator is turned on at time (t+1); and the generator has been on for 1 time period after turning on at time (t+2). For the generator in FIG. 3 the minimum up $UT_g$ and down times $DT_g$ are 2 and the cols cost start-up time is $TC_g=1$. In other words, the sequence of states in $OnOff_g$ can also be written as $(Off_{DTg-1}, Off_{DTg+TCg-1}, On_0, On_{UTg-1})$. The same information can also be deduced from decision diagram, of UCO-DD formulation, in FIG. 2. At start of the horizon, the number of hours the generator has already been in operation or out of operation is known. Thus, even though the decision diagram has reduced information embedded in (UCP-1), in the context of (EF) both approaches yield identical information on the number of hours the generator has been on/off at each time instant.

In addition, for each such sequence of states s(p) associate at each time instant a number indicating the number of time periods prior to turning the generator off. This can be obtained by proceeding as follows from the last time period. Define $Time2Off_T(p)=\infty$. For all other times $t=(T-1), \ldots, 1$ define $Time2Off_t(p)$ as ($Time2Off_{t+1}(p)+1$) if $s_t \in On_g$, $s_{t+1} \in On_g$,
1 if $s_t \in On_g$, $s_{t+1} \in Off_g$
$\infty$ if $s_t \in Off_g$ Further, with each such sequence of states $s(p)=\{s_0, s_1, \ldots, s_T\}$ for $s_t \in OnOff_g$
associate the following parameters for each time period as
$\alpha_t(p)=1$ if $s_t \in ON_g$ that is the generator is on for $t= \{1, \ldots, T\}$
$\beta_t(p)=PM_g(\tau)$ if $s_t \in On_\tau$, $s_{t+1} \notin Off_g$; $=SD_g$ if $s_t \in On_g$, $s_{t+1} \in Off_g$; $=0$ otherwise
$\delta_t(p)=\min(Pmax_g-Pmin_g, SD_g+(Time2Off_t(p)-1)RD_g-Pmin_g)$ if $s_t \in On_g$; $=0$ otherwise
$\phi_t(p)=RUM_g(\tau)$ if $s_t=On_\tau$, $s_{t+1} \notin Off_g$; $=SD_g$ if $s_t \in On_g$, $s_{t+1} \in Off_g$; $=0$ otherwise
$\theta_t(p)=RDM_g(\tau)$ if $s_t=On_\tau$, $s_{t+1} \notin Off_g$; $=SD_g-Pmin_g$ if $s_{t-1} \in On_g$, $s_t \in Off_g$; $=0$ otherwise
$\eta_t(p)=CH_g+(C0_g+C1_g \; Pmin_g)$ if $s_t \in Off_g \setminus \{Off_{TCg-1}\}$, $s_{t+1} \in On_g$; $=CC_g+(C0_g+C1_g \; Pmin_g)$ if $s_t=Off_{TCg-1}$, $s_{t+1} \in On_g$; $=(C0_g+C1_g \; Pmin_g)$ if $s_t \in On_g$; $=0$ otherwise.

Based on the definition of the parameter $\eta_t(p)$ a cost coefficient $\eta(p)$ is associated with each path as is defined as $\eta(p)=\sum_{t=1}^{T} \eta_t(p)$.

In the EF formulation, the path variables are:

$z_p \in \{0,1\} \; \forall p \in \mathcal{P}^g$ indicating the choice of a path p from the decision diagram.

The continuous variables that are associated with the formulation are:
$p_{g,t}$—continuous variable modeling the excess over the minimum that is produced by generator at time t
$Pm_{g,t}$ continuous variable modeling the maximum power that the generator can potentially produce if required at time t The power productions limits on the generator are modeled for $g \in G$, $t \in T$ as $$p_{g,t}+P \min_g \sum_{p \in \mathcal{P}^g}(\alpha_t(p)z_p) \leq Pm_{g,t} \quad \text{Eq (18)}$$

$$Pm_{g,t} \leq \sum_{p \in \mathcal{P}^g}(\beta_t(p)z_p) \quad \text{Eq (19)}$$

$$P_{g,t} \leq \sum_{p \in \mathcal{P}^g}(\delta_t(p)z_p). \quad \text{Eq (20)}$$

The ramp-up limit constraints are modeled for $g \in G$, $t \in T$ as $$Pm_{g,t}-p_{g,t-1} \leq \sum_{p \in \mathcal{P}^g}(\theta_t(p)z_p). \quad \text{Eq (21)}$$

The ramp-down limit constraints are modeled for $g \in G$, $t \in T$ as $$p_{g,t-1}-p_{g,t} \leq \sum_{p \in \mathcal{P}^g}(\phi_t(p)z_p). \quad \text{Eq (22)}$$

The demand and reserve satisfaction constraints are imposed for $t \in T$ as $$\Sigma_{g \in G}(p_{g,t}+P \min_g \sum_{p \in \mathcal{P}^g}(\alpha_t(p)z_p)) \geq Pdem_t \quad \text{Eq (23)}$$

$$\Sigma_{g \in G} Pm_{g,t} \geq Pres_t \quad \text{Eq (24)}$$

The optimization problem for the (EF) is

Min $\Sigma_{g \in G} \sum_{p \in \mathcal{P}^g}(\eta(p)z_p)+\Sigma_{g \in G}\Sigma_{t \in T} C1_g p_{g,t}$
s.t. Eq (18)-Eq (24)

$\Sigma_{p \in \mathcal{P}^g} z_p=1 \forall g \in G$ $z_p \in \{0,1\}$ $p_{g,t}, Pm_{g,t} \geq 0.$      Eq (UCP-EF)

The constraints Eq (18)-(24) in the formulation in Eq (UCP-EF) are the path-based operational constraints of the generators.

The solution of the optimization problem in (UCP-EF) is challenging since the number of variables in the formulation is potentially exponential.

In another embodiment of the invention, a Branch-and-Price (BP) algorithm is proposed wherein the number of variables in the optimization problem are progressively increased. Further, branching is incorporated in order obtain a complete method that obtains a solution.

The BP algorithm proceeds by defining an initial search-tree node with no branching decisions and choose for $g \in G$, a subset of paths $\tilde{\mathcal{P}}^g \subseteq \mathcal{P}^g$ are chosen representing a subset of the generator's on/off operations satisfying the minimum up/down time constraints. Denote by $\tilde{\mathcal{P}} := \cup_{g \in G} \tilde{\mathcal{P}}^g$. With the subset of paths an optimization problem called as the restricted master problem (RMP) is defined. The variables in the RMP are the path variables:

$z_p \in \{0,1\} \forall p$ $\in \tilde{\mathcal{P}}^g$ indicating the choice of a path from the decision diagram from generator g The objective function in the RMP formulation is $$\sum_{g \in G} \sum_{p \in \tilde{\mathcal{P}}^g} \eta(p)z_p + \sum_{g \in G} \sum_{t \in T} C1_g p_{g,t} \quad \text{(RMP. 1)}$$

The continuous variables that are associated with the formulation are:
$p_{g,t}$—continuous variable modeling the excess over the minimum that is produced by generator at time t
$Pm_{g,t}$—continuous variable modeling the maximum power that the generator can potentially produce if required at time t The constraints in the RMP formulation are:

$$\Sigma_{p \in \tilde{\mathcal{P}}^g} z_p = 1 \; \forall g \in G \quad \text{(RMP.2)}$$

where the constraint enforces exactly one path is chosen from each decision diagram for each generator.

The constraints in Eq (18)-(24) where the summation is replaced over the paths is replaced by the set $\tilde{\mathcal{P}}^g$ instead of the set $\mathcal{P}^g$. (RMP.3)

$z_p \in \{0,1\} \forall g \in G, \forall p \in \tilde{\mathcal{P}}^g$      (RMP.4)

where the constraint enforces that the variables are binary valued.

The RMP formulation can be posed as
min (RMP.1)
s.t. Eqs. (RMP.2)-(RMP.4) (RMP)
$p_{g,t}, Pm_{g,t} \geq 0.$ The constraints in Eq (RMP.2)-(RMP.4) are the restricted master problem constraints.

The linear programming relaxation of the RMP, denoted as LPRMP, is obtained by replacing the binary requirement in (RMP.4) with $z_p \geq 0 \; \forall g \in G, \; \forall p \in \tilde{\mathcal{P}}^g$.

The LPRMP is solved using column generation where the paths $p \in \mathcal{P}^g \setminus \tilde{\mathcal{P}}^g$ are added if the associated variable in (EF) has a reduced cost that is negative at the solution corresponding to LPRMP for the chosen paths in $\tilde{\mathcal{P}}$. This is accomplished using a pricing problem that is described below.

Denote by $\mu_g \forall g \in G \in$ the Lagrange multiplier associated with (RMP.2) at the optimal the solution of the LPRMP. Denote by $\lambda_{g,\alpha,t}, \lambda_{g,\beta,t}, \lambda_{g,\delta,t}, \lambda_{g,\phi,t}, \lambda_{g,\theta,t}, \lambda_{d,t}, \lambda_{r,t} \forall t \in \mathcal{T}$ the Lagrange multiplier for Eq, (18)-(24) respectively in (RMP.3) at the optimal solution of the LPRMP.

The pricing problem (PP) to identify paths that have negative reduced cost is:

For each $g \in G$, define arc-costs $\theta(a)$ for all arcs in the decision diagram representation, UDP-DD formulation, where the cold start-up costs are not included as:

$\theta(a) = \eta_{g,t} + Pmin_g \Sigma_{j=0}^{UTg-1} \lambda_{g,\alpha,t+j} - \Sigma_{j=0}^{UTg-1} PM_g(j)\lambda_{g,\beta,t+j} - \Sigma_{j=0}^{UTg-1} RUM_g(j)\lambda_{g,\phi,t+j} - \Sigma_{j=0}^{UTg-1} RDM_g(j)\lambda_{g,\theta,t+j} - Pmin_g \Sigma_{j=0}^{UTg-1} \lambda_{d,t} - (Pmax_g - Pmin_g) \Sigma_{j=0}^{UTg-1} \lambda_{g,\delta,t+j}$ if the arc a turns the generator on at time t i.e. satisfies the transition (ST1)

$\theta(a) = (C0_g + C1_g Pmin_g) + Pmin_g \lambda_{g,\alpha,t} - Pmax_{g,\beta,t} - (Pmax_g - Pmin_g) \lambda_{g,\delta,t} - (RU_g + Pmin_g) \lambda_{g,\phi,t} - RD_g \lambda_{g,\theta,t} - Pmin_g \lambda_{d,t}$ if the arc a keeps the generator on at time t i.e. satisfies the transition (ST2).

$\theta(a) = -(SD_g - Pmax_g)\lambda_{g,\beta,t-1} - (-RU_g - Pmin_g) \Sigma_{j=0}^{DTg-1} \min(0, SD_g + (j-1)RD_g - Pmax_g)\lambda_{g,\delta,t-j} - (SD_g - RU_g - Pmin_g)\lambda_{g,\phi,t-1} - (SD_g - Pmin_g)\lambda_{g,\theta,t}$ if the arc a turns the generator off at time t i.e. satisfies the transition (ST3).

$\theta(a) = 0$ for all other arcs.

In the case of decision diagram representation with cold start-up costs, UCP-DDwCS formulation, the cost $\eta_{g,t}$ is replaced by $\eta_{g,t,k}$ according to the off state (in $Off_g$) from which the generator is started.

For each $g \in G$, find the minimum cost from the initial states of the generators to reach a state at final time $p^g$ path is determined using the arc costs $\theta(a)$. Such calculations can be performed using the well known Djikstra's algorithm.

For each $g \in G$, the path $p^g$ is added to $\tilde{\mathcal{P}}^g$ the reduced cost defined as, $\Sigma_{a \in p} \theta(a) - \mu_g < 0$.

Solving the (RMP) as an integer program results in a feasible solution to the scheduling of passengers. A branch-and-bound search is conducted to complete the BP algorithm. A queue of search-tree nodes $\Gamma$ is defined, initialized as a singleton $\gamma'$. At any point in the execution of the algorithm, each search node $\gamma \in \Gamma$ is defined by a set of branch decisions out($\gamma$), in($\gamma$). The branch-and-bound search maintains the best known solution z* and its objective value f*.

While $\Gamma \neq \emptyset$, a search node $\gamma$ is selected to explore. The chosen node is the one with the worst LPRMP objective value of the search node from which it was created. The LPRMP for the search node $\gamma$ is solved using column generation as described before. If the optimal objective value of the LPRMP($\gamma$) is greater than f* then the node is pruned, and the search continues by selecting another node in $\Gamma$. Otherwise, the integer program in (RMP) is solved and the solution z' with objective value f' is obtained. If f' is lower than f* then z*, f* are replaced by z', f' respectively. Let $y_p^*$ denote the optimal value to the LPRMP. The path p= $argmin_{p \in \tilde{\mathcal{P}}(\gamma)} |y_p^* - 0.5|$ with the fractional is selected to branch on. Two nodes $\gamma^0, \gamma^1$ are created with in($\gamma^0$)=in($\gamma$), out ($\gamma^0$)=out($\gamma$)∪{p} and in($\gamma^1$)=in($\gamma$)∪{p} and out($\gamma^1$)=out($\gamma$), and update the search tree as $\Gamma = \Gamma \cup \{\gamma^0, \gamma^1\} \setminus \{\gamma\}$.

Finding an initial feasible solution an initial feasible solution to RMP is obtained by defining a path $p^{g,0}$ for each $g \in G$ starting from the initial state perform the following steps: (a) choose the arc that allows to turn the generator on tat the earliest time if the generator is currently off or choose the arc that keeps the generator on if the generator is already on while satisfying the state transitions; (b) repeating the step in (a) from the resultant state in the next time period until the end of the time horizon. Using with just this singleton element in the sets $\tilde{\mathcal{P}}^g$ solve the (LPRMP). If this problem is feasible then obtain an upper bound on the cost of operation. Note that the above choice corresponds to choosing the most expensive solution in terms of the cost of the operations since all the generators are kept on for most periods. If this problem is infeasible then it is determined that the demand and reserve requirements cannot be satisfied using the given generators.

Identifying a Feasible Solution

Suppose that $y_p^* \forall p \in \tilde{\mathcal{P}}$ is the optimal solution the LPRMP and the solution is not integral. Then solve the (RMP) to obtain a feasible solution. This does not need to be solved to optimality. Instead, the (RMP) can be solved to generate better feasible solutions as opposed to proving optimality.

Figure 6:
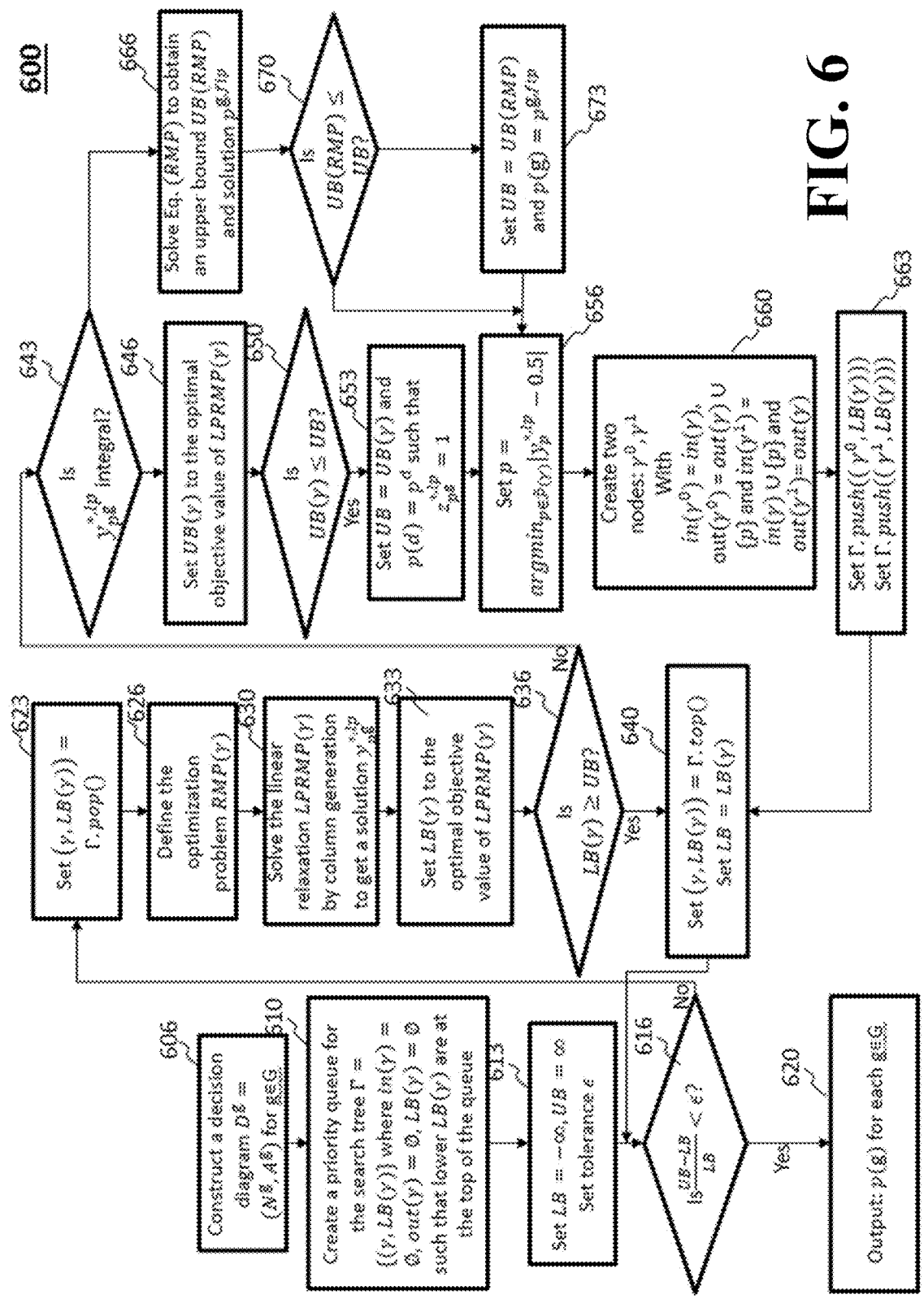
FIG. 6 is an illustration of the flowchart for optimizing the scheduling of the generators using the Branch-and-Price formulation in BP.

FIG. 6 is an illustration of the flowchart for optimizing the scheduling of the generators using the Branch-and-Price formulation in BP. The decision diagram (using either the UCP-DD or UCP-DDwCS formulation) is constructed for each generator 606, and a search tree $\Gamma = \{(\gamma, LB(\gamma))\}$ where in($\gamma$)=∅, out($\gamma$)=∅, LB($\gamma$)=∅ such that lower LB($\gamma$) are at the top of the queue 610. The lower bound and upper bound for the problem are initialized 613. The algorithm checks if the lower and upper bound are close to each other in 616. If this true then the algorithm outputs the optimal path in the decision diagram for each generator. If not, the algorithm chooses the top element in the search tree 623. The algorithm defined the optimization problem RMP ($\gamma$) 626 and the linear relaxation problem is solved 630 to obtain the optimal solution of the linear program. The objective value of the LPRMP($\gamma$) is assigned to the be lower bound LB($\gamma$) 633. The algorithm checks if the lower bound for the node is higher than or equal to the upper bound for the tree 636. If true, then this node is fathomed and algorithm proceeds to pick another node 640. If not, the algorithm checks if the solution of the linear program is integral 643. If the solution is integral then the algorithm sets the upper bound for the node 646 and checks if the upper bound for the noder is better than the upper bound for the search tree 650. If this is true, then upper bound for the search is updated and the optimal paths in each decision diagram are updated 653. The algorithm chooses a path on which to branch 656 and creates two child nodes 660 and appends these to the search tree 106 and the algorithm proceeds to the next node in the search tree. If the solution of the linear relaxation is not integral, then the algorithm attempts to find a feasible solution by solving the optimization problem (RMP) 666. The optimal objective value for the (RMP) is checked against the upper bound for the search tree 670. If the upper bound is better then the upper bound for the tree and optimal solution are updated 673. The algorithm proceeds to branch as described earlier 656. If the upper bound is not better than that for the tree then again the algorithm proceeds to branch as described earlier 656.

UCP Formulation with Decision Diagram and Demand Uncertainty (UCP-DD-DU)

In another embodiment of the invention is considered the scheduling of generators in the presence of uncertainty in the demand. This is particularly important in the face of incorporation of renewables such as wind and solar in the power generation sources. Due to this the demand variability is significant based on the weather pattern that is realized in the day. However, the commitment of the units is performed at the beginning of the day and hence, (i) the power from the renewable sources must be predicted using the predictions on the weather pattern for that day; and (ii) the possible demand patterns must be derived for the day based on the power from renewables. Hence, in the face of renewables the UCP problem has demand uncertainty. The demand uncertainty is represented as a set of scenarios $Q=\{1, \ldots, Q\}$ where for each scenario q a different demand and reserve pattern: $(Pdem_t(q), Pres_t(q))$ is assumed.

Figure 7:
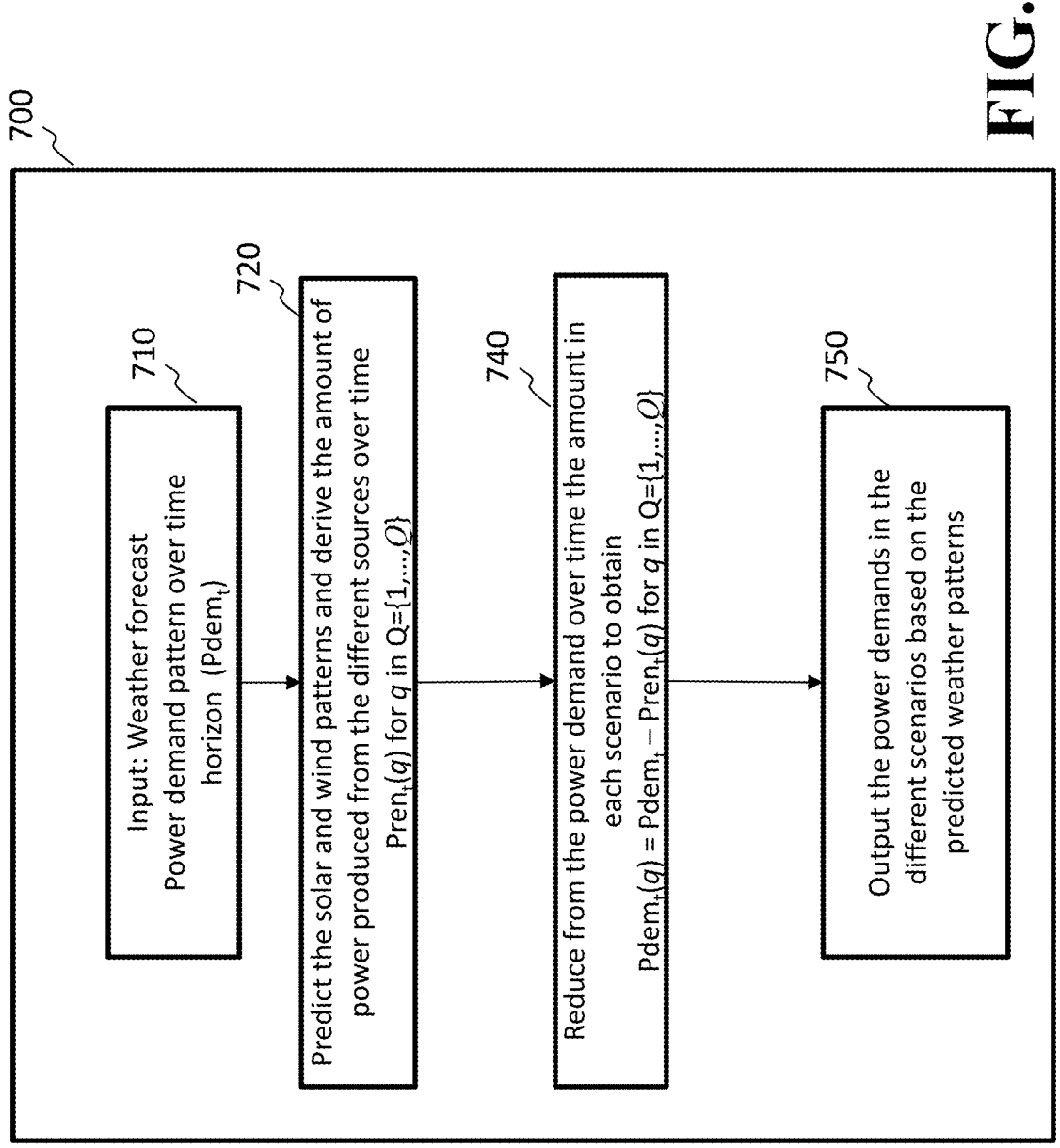
FIG. 7 is an illustration of the steps involved in the prediction of the power demand patterns based on the variability in the weather based on the embodiments of the invention.

FIG. 7 is an illustration of the steps involved in the prediction of the power demand patterns based on the variability in the weather based on the embodiments of the inventions. The method takes as input 710 the weather prediction over the time horizon of operations and the power demand over the time. Based on the weather prediction the power that can be derived solar and wind patterns are predicted 720 over the time horizon and lumped together as renewable source. The power from renewable sources is reduced from the demand pattern to obtain the power demand in the different scenarios 740. The power demand patterns for the scenarios are output 750 to be used as input for the scheduling of the generators.

The binary variables in UCP-DD-DU are identical to those in UCP-DD. Binary variables are associated with the arcs to indicate the state transition that is chosen at each time period. The UCP is formulated using these arc variables that represent state transformation in the decision diagram. The arc variables in the formulation associated with the decision diagram representation in FIG. 2 for each t in T are $s_{g,t} \in \{0,1\}$—indicating the generator is turned on at time t. This is the arc 224 connecting the states $Dn_{t-1}$ and $Up_{t+UTg-1}$.

$x_{g,t} \in \{0,1\}$—indicating the generator is turned on at time t for at least $UT_g$ time periods. This is the arc 215 connecting the states $Up_{t-1}$ and $Up_t$.

$z_{g,t} \in \{0,1\}$—indicating the generator is turned off at time t. This is the arc 234 connecting the states $Up_{t-1}$ and $Dn_{t+DTg-1}$.

$w_{g,t} \in \{0,1\}$—indicating the generator is turned on at time t for at least $DT_g$ time periods. This is the arc 220 connecting the states $Up_{t-1}$ and $Up_t$.

The arc transitioning between state $Dn_{t-1}$ and $Up_{t+UTg-1}$ can also be used to determine how long the generator has been in operation since turning on. For example, the arc 224 connects the states $Dn_{t-1}$ and $Up_{t+UTg-1}$. If this particular arc is chosen then is clear that the generator g: (i) has been on for 0 time periods at time t; (ii) has been on for 1 time period at time (t+1); and so on so that the generator g is on for $(UT_g-1)$ time periods at time $(t+UT_g-1)$. Since the representation allows for obtaining additional information such as the number of hours the generator g has been in operation, this can be used to obtain a tight representation of the feasible space of operations for the generator. This is a key realization of the invention.

The continuous variables that are associated with the formulation are now dependent on the scenario $q \in Q$:

$p_{g,t}(q)$—continuous variable modeling the excess over the minimum that is produced by generator at time t $Pm_{g,t}(q)$—continuous variable modeling the maximum power that the generator can potentially produce if required at time t towards the reserve requirement $Cs_{g,t}$—continuous variable modeling the cold start-up costs at time t The constraints in the formulation for each generator and each time t are provided below. The variables with indices that are less than 1 are assumed to represent the generator's operational history 123 and are not variables in the optimization.

The operations of the generator that satisfy the minimum up and down time requirements are directly modeled using the constraints for $g \in G$, $t \in T$ are identical to Eq (1)-(2).

Tight Constraints

The constraints are identical to the tight constraints in UCP-DD but are now applied for each scenario $q \in Q$. The power productions limits on the generator are modeled for $g \in G$, $t \in T$, $q \in Q$ as $$p_{g,t}(q) + P\min_g(s_{g,t-UTg+1} + \ldots + s_{g,t} + x_{g,t}) \leq Pm_{g,t}(q) \quad \text{Eq (3q)}$$

$$Pm_{g,t}(q) \leq (PM_g(UT_g-1)s_{g,t-UTg+1} + \ldots + PM_g(0)s_{g,t} + P\max_g x_{g,t}) + (SD_g - P\max_g)z_{g,t+1} \quad \text{Eq (4q)}$$

$$p_{g,t}(q) \leq (P\max_g - P\min_g)(s_{g,t-UTg+1} + \ldots + s_{g,t}) + (P\max_g - P\min_g)x_{g,t} + \sum_{j=1}^{DTg-1}\min(0, SD_g+(j-1)RD_g - P\max_g)z_{g,t+k} \quad \text{Eq (4aq)}$$

where the $PM_g(j)$ for $j = (UT_g-1), \ldots, 0$ is defined in Eq (4b).

The ramp-up limit constraints are modeled for $g \in G$, $t \in T$, $q \in Q$ as $$Pm_{g,t}(q) - p_{g,t-1}(q) \leq RUM_g(UT_g-1)s_{g,t-UTg+1} + \ldots + RUM_g(0)s_{g,t} + (RU_g + P\min_g)x_{g,t} + (SD_g - P\max_g)z_{g,t+1} \quad \text{Eq (5q)}$$

where the $RUM_g(j)$ for $j = (UT_g-1), \ldots, 0$ is defined in Eq (5a).

The ramp-down limit constraints are modeled for $g \in G$, $t \in T$, $q \in Q$ as $$p_{g,t-1}(q) - p_{g,t}(q) \leq RDM_g(UT_g-1)s_{g,t-UTg+1} + \ldots + RDM_g(0)s_{g,t} + RD_g x_{g,t} + (SD_g - P\min_g)z_{g,t} \quad \text{Eq (6q)}$$

where the $RDM_g(j)$ for $j = (UT_g-1), \ldots, 0$ is defined in Eq (6a).

The cold start-up costs associated with the generator are modeled as in Eq (7).

The demand and reserve satisfaction constraints are imposed for $t \in T$, $q \in Q$ as $$\sum_{g \in G}(p_{g,t}(q) + P\min_g(s_{g,t-UTg+1} + \ldots + s_{g,t} + x_{g,t})) \geq Pdem_t(q) \quad \text{Eq (8q)}$$

$$\sum_{g \in G} Pm_{g,t}(q) \geq Pres_t(q) \quad \text{Eq (9q)}$$

The start-up variables are associated with the costs of operation $\eta_{g,t}$ as follows $$\eta_{g,t} = CH_g + \min(T-t+1, UT_g)(C0_g + C1_g P\min_g)$$

Once the generator is turned on since it is required to be on for at least $UT_g$ periods the fixed costs of operation with the generator are $C0_g + UT_g(C1_g Pmin_g)$. The minimum is applied to ensure that the operational costs associated with the generator are only for the time periods within the horizon T. Since the hot start cost is smaller than the cold start cost, switching on the generator requires that at least a cost of $CH_g$ is incurred.

The optimization problem for the UCP can be formulated as

Min $\sum_{g \in G} \sum_{t \in T} (\eta_{g,t} s_{g,t} + (C0_g + C1_g P\min_g)x_{g,t} + Cs_{g,t} + C1_g \sum_{q \in Q} p_{g,t}(q))$ s.t. Eq (1)-Eq (2), Eq (7),
Eq (3q), (4q) (4aq), (5q), (6q), (8q), (9q) for $q \in Q$ $s_{g,t}, x_{g,t}, w_{g,t}, z_{g,t} \in \{0,1\}$ $p_{g,t}(q), Pm_{g,t}(q), Cs_{g,t} \geq 0$. \quad Eq (UCP-1-DU)

The objective function in Eq (UCP-1-DU) models the expected cost of operating the generators. The constraints Eq (1)-Eq (2), are the network flow constraints and the Eq (7), Eq(3q), (4q) (4aq), (5q), (6q), (8q), (9q) for $q \in Q$ are the tight constraints in the formulation in Eq (UCP-1-DU).

Note that when the number of scenarios is one ($|Q|=1$) then the formulation is Eq (UCP-1-DU) is identical to the formulation in Eq (UCP-1). In other words, the formulation with demand uncertainty reduces to the formulation with no uncertainty when the number of scenarios is just one.

Figure 8:
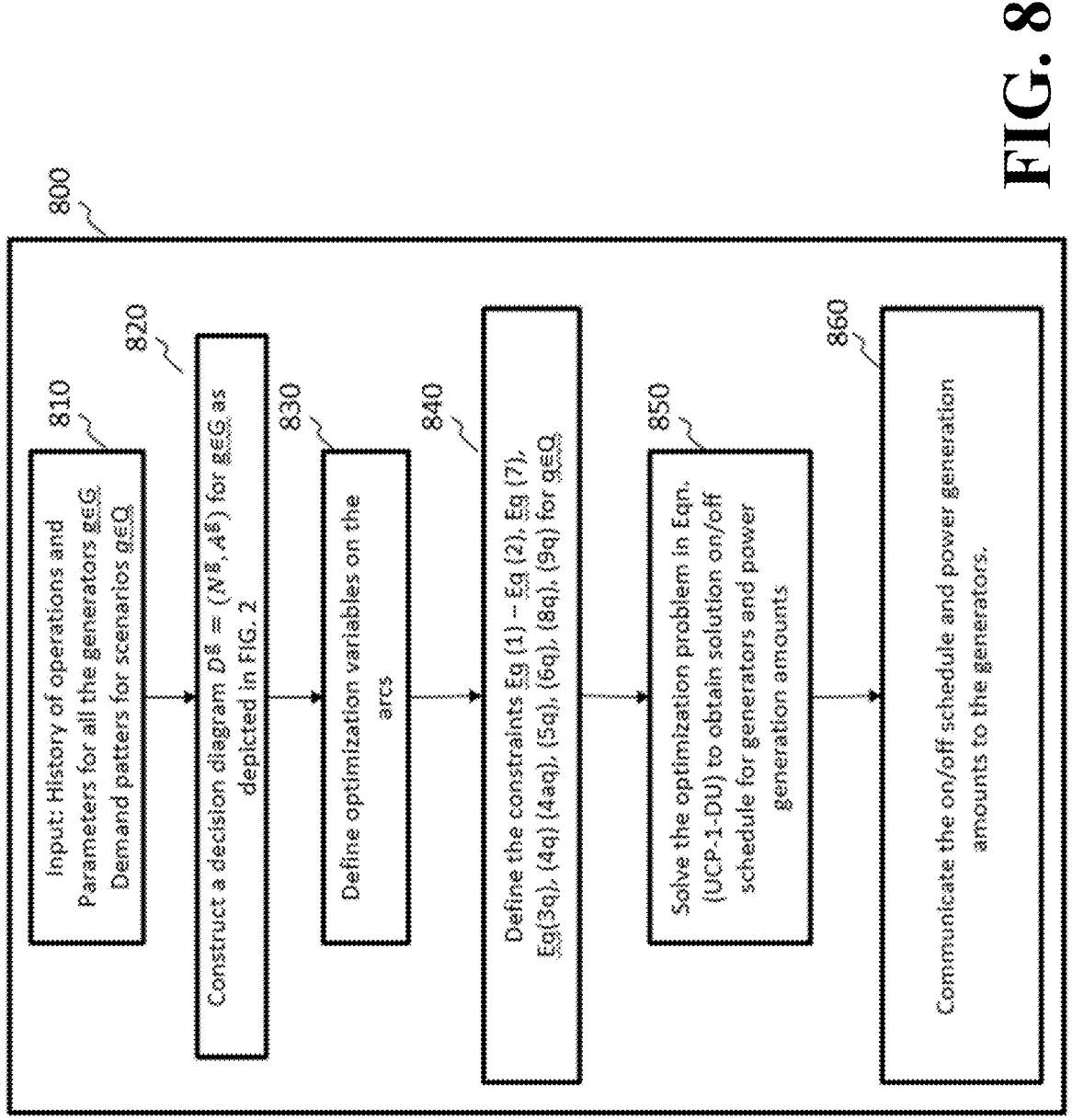
FIG. 8 is a schematic for describing the steps involved in the determination on/off and power generation schedules for the generators with demand uncertainty according to some embodiments of the invention.

FIG. 8 is a schematic for describing the steps involved in the determination on/off and power generation schedules for the generators with demand uncertainty according to the formulation described in Eq (UCP-1-DU). The method takes as input 810 the generators history of operations and parameters. The decision diagram for each generator 820 is constructed according to the description provided herein. The optimization variables 830 and the constraints 840 are defined as described herein. The formulation Eq. (UCP-1-DU) is solved 850 and the obtained on/off schedule and power generation schedules are communicated to the generators 860.

UCP Formulation with Decision Diagram Including Cold Start Costs and Demand Uncertainty (UCP-DDwCS-DU)

The binary variables in the formulation are identical to the UCP-DDwCS formulation. Binary variables are associated with the arcs to indicate the state transition that is chosen at each time period.

The arc variables that represent state transformation in the decision diagram in the formulation associated with the state-space representation in FIG. 3 for each t in T are $s_{g,t,k} \in \{0,1\}$—indicating the generator is turned on at time t from state $Up_{t,k}$. This is the arc 372, 364 connecting the states $Dn_{t-t}$ and $Up_{t+UTg-1}$.

$x_{g,t} \in \{0,1\}$—indicating the generator is turned on at time t for at least $UT_g$ time periods. This is the arc 344 connecting the states $Up_{t-1}$ and $Up_t$.

$z_{g,t} \in \{0,1\}$—indicating the generator is turned off at time t. This is the arc 344 connecting the states $Up_{t-1}$ and $Dn_{t+DTg-1}$.

$w_{g,t,k} \in \{0,1\}$—indicating the generator continues to be turned off beyond the minimum down time $DT_g$ time periods and is in state $Dn_{(t,min(TCg-1,k+1)}$ at time t. This is the arc 334 connecting the states $Dn_{t-1,TCg-1}$ and $Dn_{t,TCg-1}$.

The arc transitioning between state $Dn_{t-t,k}$ and $Up_{t+UTg-1}$ can also be used to determine how long the generator has been in operation since turning on. For example, the arc 364 connects the states $Dn_{t-1,1}$ and $Up_{t+UTg-1}$. The arc 372 connects the states $Dn_{t-1,0}$ and $Up_{t+UTg-1}$. If this particular arc is chosen then it is clear that the generator g: (i) has been on for 0 time periods at time t; (ii) has been on for 1 time period at time (t+1); and so on so that the generator g is on for ($UT_g$-1) time periods at time (t+$UT_g$-1). Since the representation allows for obtaining additional information such as the number of hours the generator g has been in operation, this can be used to obtain a tight representation of the feasible space of operations for the generator.

In addition, the arc transitioning between state $Dn_{t-DTg+1,k}$ and $Up_{t+1}$ can be associated with different start-up costs. For instance, the arcs ($Dn_{t-DTg+1,k}$,$Up_{t+1}$) with $0 \leq k \leq (TC_g-2)$ are associated with hot start-up costs. On the other hand, the arc ($Dn_{t-DTg+1,TCg-1}$,$Up_{t+1}$) is associated with the higher cold start-up costs. A key realization is that this representation is the convex hull of the feasible schedules of the generator satisfying the minimum up and down requirements including the start-up costs.

The continuous variables that are associated with the formulation are now defined for each scenario $q \in Q$:

$p_{g,t}(q)$—continuous variable modeling the excess over the minimum that is produced by generator at time t $Pm_{g,t}(q)$—continuous variable modeling the maximum power that the generator can potentially produce if required at time t The constraints in the formulation for each generator and each time t are provided below. The variables with indices that are less than 1 are assumed to represent the generator's operational history and are not variables in the optimization.

The operations of the generator that satisfy the minimum up and down time requirements are directly modeled using the constraints for $g \in G$, $t \in T$ are identical to Eq (10)-Eq (11).

Tight Constraints

The power productions limits on the generator are modeled for $g \in G$, $t \in T$, $q \in Q$ as $$p_{g,t}(q) + P\min_g(\Sigma_{k=0}^{TCg-1}(s_{g,t-UTg+1,k} + \ldots + s_{g,t,k}) + x_{g,t}) \leq Pm_{g,t}(q) \quad \text{Eq (12q)}$$

$$Pm_{g,t}(q) \leq (\Sigma_{k=0}^{TCg-1}(PM_g(UT_g-1)s_{g,t-UTg+1,k} + \ldots + PM_g(0)s_{g,t,k}) + P\max_g x_{g,t}) + (SD_g - P\max_g)z_{g,t+1} \quad \text{Eq (13q)}$$

$$p_{g,t}(q) \leq (P\max_g - P\min_g)\Sigma_{k=0}^{TCg-1}(s_{g,t-UTg+1,k} + \ldots + s_{g,t,k}) + (P\max_g - P\min_g)x_{g,t} + \Sigma_{j=1}^{DTg-1}\min(0, SD_g) + (RD_g - P\max_g)z_{g,t+j} \quad \text{Eq (13aq)}$$

where the $PM_g(j)$ for $j=(UT_g-1), \ldots, 0$ is defined for generators as in Eq. (4b).

The ramp-up limit constraints are modeled for $g \in G$, $t \in T$, $q \in Q$ as $$Pm_{g,t}(q) - p_{g,t-1}(q) \leq \Sigma_{k=0}^{TCg-1}(RUM_g(UT_g-1)s_{g,t-UTg+1,k} + \ldots + RUM_g(0)s_{g,t,k}) + (RU_g + P\min_g)x_{g,t} + (SD_g - P\max_g)z_{g,t+1} \quad \text{Eq (14q)}$$

where the $RUM_g(j)$ for $j=(UT_g-1), \ldots, 0$ is defined for generators as in Eq (5a).

The ramp-down limit constraints are modeled for $g \in G$, $t \in T$, $q \in Q$ as $$p_{g,t-1}(q) - p_{g,t}(q) \leq \Sigma_{k=0}^{TCg-1}(RDM_g(UT_g-1)s_{g,t-UTg+1,k} + \ldots + RDM_g(0)s_{g,t,k}) + RD_g x_{g,t} + (SD_g - P\min_g)z_{g,t} \quad \text{Eq (15q)}$$

where the $RDM_g(j)$ for $j=(UT_g-1), \ldots, 0$ is defined for generators as in Eq (6a).

A key realization in Eq (15) is that the introduced start-up variables allow to tighten the bounds on the ramp-down limit that improves upon the previous formulations.

The demand and reserve satisfaction constraints are imposed for $t \in T$, $q \in Q$ as $$\Sigma_{g \in G}(p_{g,t}(q) + P\min_g(\Sigma_{k=0}^{TCg-1}(s_{g,t-UTg+1,k} + \ldots + s_{g,t,k}) + x_{g,t})) \geq Pdem_t(q) \quad (16q)$$

$$\Sigma_{g \in G} Pm_{g,t}(q) \geq Pres_t \quad \text{Eq (17q)}$$

The start-up variables are associated with the costs of operation $\eta_{g,t,k}$ as follows $$\eta_{g,t,k} = CH_g + \min(T-t+1, UT_g)(C0_g + C1_g P\min_g) \text{ for } k=0, \ldots, (TC_g-2)$$

$$\eta_{g,t,k} = CC_g + \min(T-t+1, UT_g)(C0_g + C1_g P\min_g) \text{ for } k=0, \ldots, (TC_g-1)$$

Once the generator is turned on since it is required to be on for at least $UT_g$ periods the fixed costs of operation with the generator are $C0_g + UT_g(C1_g P\min_g)$. The minimum is applied to ensure that the operational costs associated with the generator are only for the time periods within the horizon T.

The optimization problem for the UCP to determine the optimal schedules for the generators can be formulated as Min $\Sigma_{g\in G}\Sigma_{t\in T}(\Sigma_{k=0}^{TCg-1}\eta_{g,t,k}s_{g,t,k}+(C0_g+C1_g\,Pmin_g)$
  $x_{g,t}+C1_g\Sigma_{q\in Q}p_{g,t}(q))$
s.t. Eq (10)-Eq (11)
  Eq (12q), (13q), (13aq), (14q) (17q) for $q\in Q$ $s_{g,t,k},x_{g,t},w_{g,t,k},z_{g,t}\in\{0,1\}$ $p_{g,t}(q), Pm_{g,t}(q)\geq 0$.         Eq (UCP-2-DU)

The objective function in Eq (UCP-2-DU) models the expected cost of operating the generators. The constraints Eq (10)-Eq (11) are the network flow constraints, and Eq (12q), (13q), (13aq), (14q)-(17q) for $q\in Q$ are the tight constraints in the formulation in Eq (UCP-2-DU).

Note that when the number of scenarios is one ($|Q|=1$) then the formulation is Eq (UCP-2-DU) is identical to the formulation in Eq (UCP-2). In other words, the formulation with demand uncertainty reduces to the formulation with no uncertainty when the number of scenarios is just one.

Figure 9:
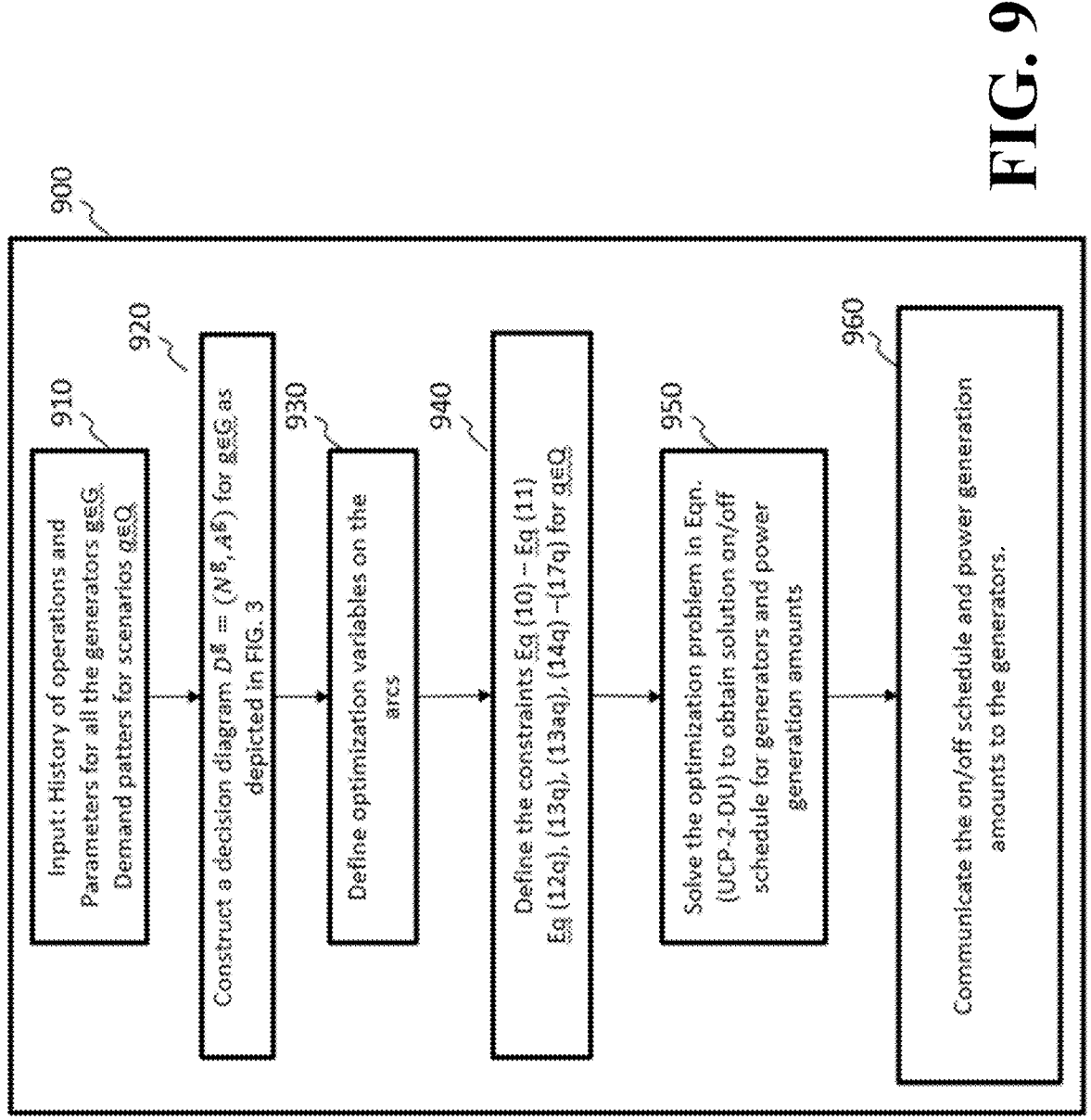
FIG. 9 is a schematic for describing the steps involved in the determination on/off and power generation schedules for the generators with demand uncertainty according to some embodiments of the invention.

FIG. 9 is a schematic for describing the steps involved in the determination on/off and power generation schedules for the generators with demand uncertainty according to the formulation described in Eq (UCP-2-DU). The method takes as input 910 the generators history of operations and parameters. The decision diagram for each generator 920 is constructed according to the description provided herein. The optimization variables 930 and the constraints 940 are defined as described herein. The formulation Eq. (UCP-2-DU) is solved 950 and the obtained on/off schedule and power generation schedules are communicated to the generators 960.

Branch-and-Price Formulation with Demand Uncertainty (BP-DU)

In another embodiment of the invention, the Branch-and-Price formulation is extended to the scheduling of generators with demand uncertainty. The definition of paths in the decision diagrams and the parameters Time2Off$_t$(p), $\alpha_t$(p), $\beta_t$(p), $\delta_t$(p), $\phi_t$(p), $\theta_t$(p), $\eta_t$(p) are as defined in the BP formulation.

Based on the definition of the parameter $\eta_t$(p) a cost coefficient $\eta$(p) is associated with each path as is defined as $\eta(p)=\Sigma_{t=1}^{T}\eta_t(p)$.

In the EF formulation with demand uncertainty, the path variables are: $z_p\in\{0,1\}\ \forall\ p\in\mathcal{P}^g$ indicating the choice of a path p from the decision diagram.

The continuous variables that are associated with the formulation in each scenario $q\in Q$ are:

$p_{g,t}$(q)—continuous variable modeling the excess over the minimum that is produced by generator at time t $Pm_{g,t}$(q)—continuous variable modeling the maximum power that the generator can potentially produce if required at time t The power productions limits on the generator are modeled for $g\in G$, $t\in T$, $q\in Q$ as $p_{g,t}(q)+P\,min_g\Sigma_{p\in\mathcal{P}^g}(\alpha_t(p)z_p)\leq Pm_{g,t}(q)$    Eq (18q)

$Pm_{g,t}(q)\leq\Sigma_{p\in\mathcal{P}^g}(\beta_t(p)z_p)$    Eq (19q)

$p_{g,t}(q)\leq\Sigma_{p\in\mathcal{P}^g}(\delta_t(p)z_p)$.    Eq (20q)

The ramp-up limit constraints are modeled for $g\in G$, $t\in T$, $q\in Q$ as $Pm_{g,t}(q)-p_{g,t-1}(q)\leq\Sigma_{p\in\mathcal{P}^g}(\theta_t(p)z_p)$    Eq. (21)

The ramp-down limit constraints are modeled for $g\in G$, $t\in T$, $q\in Q$ as $p_{g,t-1}(q)-p_{g,t}(q)\leq\Sigma_{p\in\mathcal{P}^g}(\phi_t(p)z_p)$.    Eq (22)

The demand and reserve satisfaction constraints are imposed for $t\in T$, $q\in Q$ as $\Sigma_{g\in G}(p_{g,t}(q)+P\,min_g\Sigma_{p\in\mathcal{P}^g}(\alpha_t(p)z_p)\leq P\mathrm{dem}_t(q)$    Eq (23q)

$\Sigma_{g\in G}Pm_{g,t}(q)\geq P\mathrm{res}_t(q)$    Eq (24q)

The optimization problem for the (EF-DU) is

Min $\Sigma_{g\in G}\Sigma_{p\in\mathcal{P}^g}(\eta(p)z_p)+\Sigma_{g\in G}\Sigma_{t\in T}C1_g\,p_{g,t}$
s.t. Eq (18q)-Eq (24q) for $q\in Q$ $\Sigma_{p\in\mathcal{P}^g}z_p=1\,\forall g\in G$ $z_p\in\{0,1\}$ $z_{g,p},Pm_{g,t}\geq 0$.      Eq (UCP-EF-DU)

The solution of the optimization problem in (UCP-EF-DU) is challenging since the number of variables in the formulation is potentially exponential.

Note that when the number of scenarios is one ($|Q|=1$) then the formulation is Eq (UCP-EF-DU) is identical to the formulation in Eq (UCP-EF). In other words, the formulation with demand uncertainty reduces to the formulation with no uncertainty when the number of scenarios is just one.

In another embodiment of the invention, a Branch-and-Price (BP-DU) algorithm is proposed wherein the number of variables in the optimization problem are progressively increased. Further, branching is incorporated in order obtain a complete method that obtains a solution.

The BP-DU algorithm proceeds by defining an initial search-tree node with no branching decisions and choose for $g\in G$, a subset of paths $\tilde{\mathcal{P}}^g\subseteq\mathcal{P}^g$ are chosen. Denote by $\tilde{\mathcal{P}}:=\cup_{g\in G}\tilde{\mathcal{P}}^g$. With the subset of paths an optimization problem called as the restricted master problem (RMP) is defined. The variables in the RMP are the path variables: $z_p\in\{0,1\}\forall p$.

$\in\tilde{\mathcal{P}}^g$ indicating the choice of a path from the decision diagram from generator g The objective function in the RMP formulation is $$\sum_{g\in G}\sum_{p\in\tilde{\mathcal{P}}^g}\eta(p)z_p+\sum_{g\in G}\sum_{q\in Q}\sum_{t\in T}C1_g\,p_{g,t}(q) \quad\text{(RMP-DU. 1)}$$

The continuous variables that are associated with the formulation for each scenario $q\in Q$ are:

$p_{g,t}$(q)—continuous variable modeling the excess over the minimum that is produced by generator at time t $Pm_{g,t}$(q)—continuous variable modeling the maximum power that the generator can potentially produce if required at time t The constraints in the RMP formulation are:

$\Sigma_{p\in\tilde{\mathcal{P}}^g}z_p=1\forall g\in G$      (RMP-DU.2)

where the constraint enforces exactly one path is chosen from each decision diagram for each generator.

The constraints in Eq (18q)-(24q) where the summation is replaced over the paths is replaced by the set $\tilde{\mathcal{P}}^g$ instead of the set $\mathcal{P}^g$. (RMP-DU. 3)

$z_p\in\{0,1\}\forall g\in G, \forall p\in\tilde{\mathcal{P}}^g$      (RMP-DU.4)

where the constraint enforces that the variables are binary valued.

The RMP formulation can be posed as
min (RMP-DU.1)
s.t. Eqs. (RMP-DU.2)-(RMP-DU.4) (RMP-DU)
$p_{g,t}(q)$, $Pm_{g,t}(q) \geq 0$.

The constraints Eqs. (RMP-DU.2)-(RMP-DU.4) are the restricted master problem constraints under demand uncertainty.

Note that when the number of scenarios is one ($|Q|Q=1$) then the formulation is Eq (RMP-DU) is identical to the formulation in Eq (RMP). In other words, the formulation with demand uncertainty reduces to the formulation with no uncertainty when the number of scenarios is just one.

The linear programming relaxation of the RMP-DU, denoted as LPRMP-DU, is obtained by replacing the binary requirement in (RMP-DU.4) with $z_p \geq 0$ $\forall g \in G$, $\forall p \in \tilde{\mathcal{P}}^g$.

The LPRMP-DU is solved using column generation where the paths $p \in \mathcal{P}^g \setminus \tilde{\mathcal{P}}^g$ are added if the associated variable in (EF-DU) has a reduced cost that is negative at the solution corresponding to LPRMP-DU for the chosen paths in $\tilde{\mathcal{P}}$. This is accomplished using a pricing problem that is described below.

Denote by $\mu_g$ $\forall g \in G$ the Lagrange multiplier associated with (RMP.2) at the optimal the solution of the LPRMP-DU. Denote by $\lambda_{g,\alpha,t}(q)$, $\lambda_{g,\beta,t}(q)$, $\lambda_{g,\delta,t}(q)$, $\lambda_{g,\phi,t}(q)$, $\lambda_{g,\theta,t}(q)$, $\lambda_{d,t}(q)$, $\lambda_{r,t}(q) \forall t \in \mathcal{T}$ the Lagrange multiplier for Eq, (18q)-(24q) respectively in (RMP.3∈) for each $q \in Q$ at the optimal solution of the LPRMP-DU.

The pricing problem (PP) to identify paths that have negative reduced cost is:
For each $g \in G$, define arc-costs $\theta(a)$ for all arcs in the decision diagram representation, UCP-DD formulation, where the cold start-up costs are not included as:
$\theta(a) = \eta_{g,t} + Pmin_g \Sigma_{q \in Q} \Sigma_{j=0}^{UTg-1} \lambda_{g,\alpha,t+j}(q) - \Sigma_{q \in Q} \Sigma_{j=0}^{UTg-1} PM_g(j)\lambda_{g,\beta,t+j}(q) - \Sigma_{q \in Q} \Sigma_{j=0}^{UTg-1} RUM_g(j)\lambda_{g,\phi,t+j}(q) - \Sigma_{q \in Q} \Sigma_{j=0}^{UTg-1} RDM_g(j)\lambda_{g,\theta,t+j}(q) - Pmin_g \Sigma_{q \in Q} \Sigma_{j=0}^{UTg-1} \lambda_{d,t}(q) - (Pmax_g - Pmin_g)\Sigma_{q \in Q} \Sigma_{j=0}^{UTg-1} \lambda_{g,\delta,t+j}(q)$ if the arc a turns the generator on at time t i.e. satisfies the transition (ST1).
$\theta(a) = (C0_g + C1_g \ Pmin_g) + Pmin_g \ \Sigma_{q \in Q} \lambda_{g,\alpha,t}(q) - Pmax_g \Sigma_{q \in Q} \lambda_{g,\beta,t}(q) - (Pmax_g - Pmin_g) \ \Sigma_{q \in Q} \lambda_{g,\delta,t}(q) - (RU_g + Pmin_g) \Sigma_{q \in Q} \lambda_{g,\phi,t}(q) - RD_g \Sigma_{q \in Q} \lambda_{g,\theta,t}(q) - Pmin_g \Sigma_{q \in Q} \lambda_{d,t}(q)$ if the arc a keeps the generator on at time t i.e. satisfies the transition (ST2).
$\theta(a) = -(SD_g - Pmax_g) \ \Sigma_{q \in Q} \ \lambda_{g,\beta,t-1}(q) - (-RU_g - Pmin_g) \Sigma_{q \in Q} \Sigma_{j=0}^{DTg-1} \min(0, SD_g + (j-1)RD_g - Pmax_g)\lambda_{g,\delta,t-j}(q) - \Sigma_{q \in Q}(SD_g - RU_g - Pmin_g) \lambda_{g,\phi,t-1}(q) - (SD_g - Pmin_g)\Sigma_{q \in Q} \lambda_{g,\theta,t}(q)$ if the arc a turns the generator off at time t i.e. satisfies the transition (ST3).
$\theta(a) = 0$ for all other arcs.

In the case of decision diagram representation with cold start-up costs, UCP-DDwCS formulation, the cost $\eta_{g,t}$ is replaced by $\eta_{g,t,k}$ according to the off state (in $Off_g$) from which the generator is started.

For each $g \in G$, find the minimum cost from the initial states of the generators to reach a state at final time $p^g$ path is determined using the arc costs $\theta(a)$. Such calculations can be performed using the well known Djikstra's algorithm.

For each $g \in G$, the path $p^g$ is added to $\tilde{\mathcal{P}}^g$ if the reduced cost defined as, $\Sigma_{a \in p^g} \theta(a) - \mu_g < 0$.

Solving the (RMP-DU) as an integer program results in a feasible solution to the scheduling of passengers. A branch-and-bound search is conducted to complete the BP algorithm. A queue of search-tree nodes $\Gamma$ is defined, initialized as a singleton $\gamma'$. At any point in the execution of the algorithm, each search node $\gamma \in \Gamma$ is defined by a set of branch decisions out($\gamma$), in($\gamma$). The branch-and-bound search maintains the best known solution z* and its objective value f*.

While $\Gamma \neq \emptyset$, a search node $\gamma$ is selected to explore. The chosen node is the one with the worst LPRMP-DU objective value of the search node from which it was created. The LPRMP-DU for the search node $\gamma$ is solved using column generation as described before. If the optimal objective value of the LPRMP-DU($\gamma$) is greater than f* then the node is pruned, and the search continues by selecting another node in $\Gamma$. Otherwise, the integer program in (RMP-DU) is solved and the solution z' with objective value f' is obtained. If f' is lower than f* then z*, f* are replaced by z', f' respectively. Let $y_p$* denote the optimal value to the LPRMP-DU. The path $p = argmin_{p \in \tilde{\mathcal{P}}(\gamma)} |y_p* - 0.5|$ with the fractional is selected to branch on. Two nodes $\gamma^0$, $\gamma^1$ are created with) in($\gamma^0$)=in($\gamma$)), out($\gamma^0$)=out($\gamma$)∪{p} and in($\gamma^1$)=in($\gamma$)∪{p} and out($\gamma^1$)=out($\gamma$), and update the search tree as $\Gamma = \Gamma \cup \{\gamma^0, \gamma^1\} \setminus \{\gamma\}$.

Finding an Initial Feasible Solution

An initial feasible solution to RMP-DU is obtained by defining a path $p^{g,0}$ for each $g \in G$ starting from the initial state perform the following steps: (a) choose the arc that allows to turn the generator on at the earliest time if the generator is currently off or choose the arc that keeps the generator on if the generator is already on while satisfying the state transitions; (b) repeating the step in (a) from the resultant state in the next time period until the end of the time horizon. Using with just this singleton element in the sets $\tilde{\mathcal{P}}^g$ solve the (LPRMP-DU). If this problem is feasible then obtain an upper bound on the cost of operation. Note that the above choice corresponds to choosing the most expensive solution in terms of the cost of the operations since all the generators are kept on for most periods. If this problem is infeasible then it is determined that the demand and reserve requirements cannot be satisfied using the given generators.

Identifying a Feasible Solution

Suppose that $\gamma_p* \forall p \in \tilde{\mathcal{P}}$ is the optimal solution the LPRMP and the solution is not integral. Then solve the (RMP) to obtain a feasible solution. This does not need to be solved to optimality. Instead, the (RMP) can be solved to generate better feasible solutions as opposed to proving optimality.

The branch and bound algorithm for solving the BP-DU is identical to the algorithm outlines in FIG. 6.

Further, the power generation planning system 100 can be applied to a different set of feasible on/off operations of the generators in the presence of start-up patterns for generating a decision diagram using the state-space representation module 124.

Figure 10A:
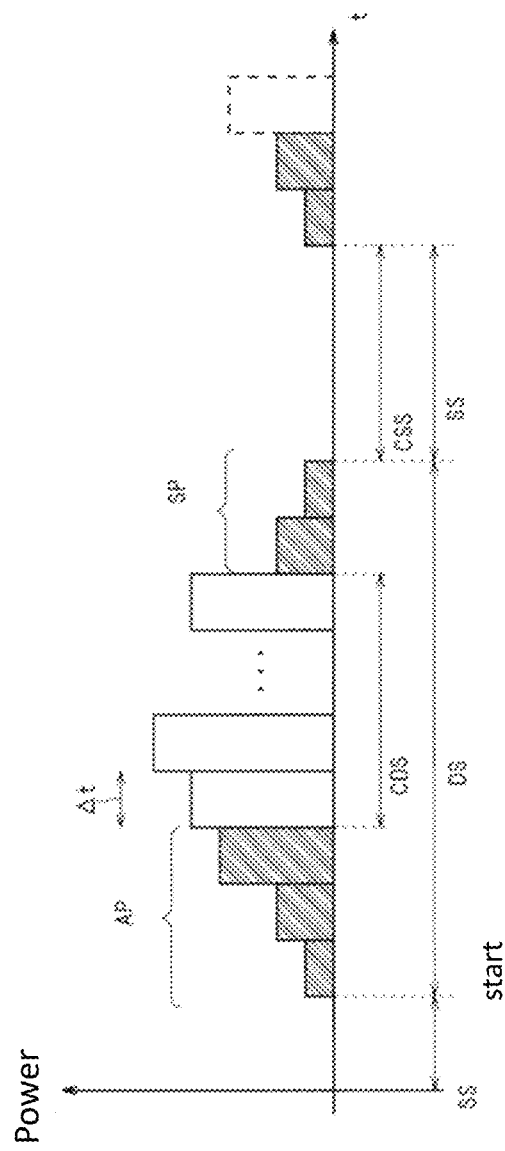
FIG. 10A is a schematic illustrating a power production pattern of a single power generator, indicating a fixed specified number of time period at a start-up and a shut-down operation to provide power production, according to embodiments of the present invention.

FIG. 10A is a schematic illustrating a power production pattern of a single power generator, indicating a fixed specified number of time periods at start-up and shut-down operations to provide power production, according to embodiments of the present invention. In the figure, the vertical and horizontal axes indicate power generation (Power) of the power generator and time t, respectively.

The operation states of the generator are indicated by a shut-down state SS, a turn-on state including a start-up pattern AP, a continuous operation (driving) state CDS, and a shut-down pattern SP. A continuous shut-down state CSS can be a variable that indicates a period of time in which the generator has been shut-down since the latest end of the SP.

A power output during the CDS can be controlled or adjusted between a predetermined maximum-minimum power range.

The AP, CDS, and SP states may simply be referred to as an operation state (DS), and the CSS may be referred to as SS.

In general, each power generator has its own AP and SP as generator parameters, which can be included in the generator parameters 116. The CSS and CDS are variables, and the CDS can be controlled/adjusted in response to a power demand profile.

In some cases, the AP of a generator can be changed according to a period of time of the CSS. For instance, when the period of time of the CSS is longer than a threshold, then the AP can be a cold-start pattern as temperature of the generator is cool. In this case the generator is scheduled to more gradually be driven up to a CDS. When the period of time of the CSS is shorter than a threshold, then the AP can be a warm-start pattern. When the period of time of the CSS is much shorter than a threshold, the AP can be a hot-start pattern.

In accordance with embodiments of the present invention, the generator parameters (AP, SP) of power generators can be represented by decision diagrams constructed using the state-space representation module 124. Further, the system 100 generates arc-variables representing state-transformations of the generators by assigning binary variables to arcs of the decision diagrams by using the variable assignment module 122, and generates network flow constraints to represent feasible operations of each of the generators, and then the system 100 obtains feasible operations (operation schedules) of the generators, in which part of the generator parameters can be used to represent constraints, network flow constraints and tight constraints for obtaining the feasible operations (operation schedules) of the generators.

Figure 10B:
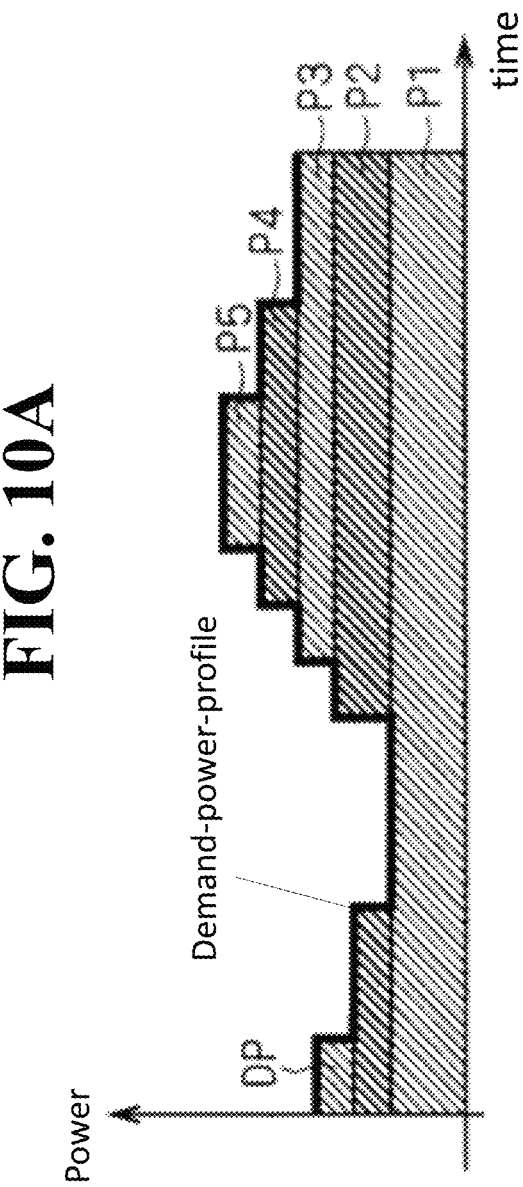
FIG. 10B is a schematic for illustrating a power generating plan to be provided by multiple power generator, according to embodiments of the present invention.

FIG. 10B is a schematic for illustrating a power generating plan achieved by multiple power generators, according to embodiments of the present invention. It is shown that a demanded-power-profile can be achieved by integrating (combining) operation schedules P1, P2, P3, P4 and P5 of multiple power generators.

In other words, the demanded-power-profile is achieved by integrating the start-up patterns, continuous operation states, shut-down patterns and continuous shut-down states of the generators.

Figure 11:
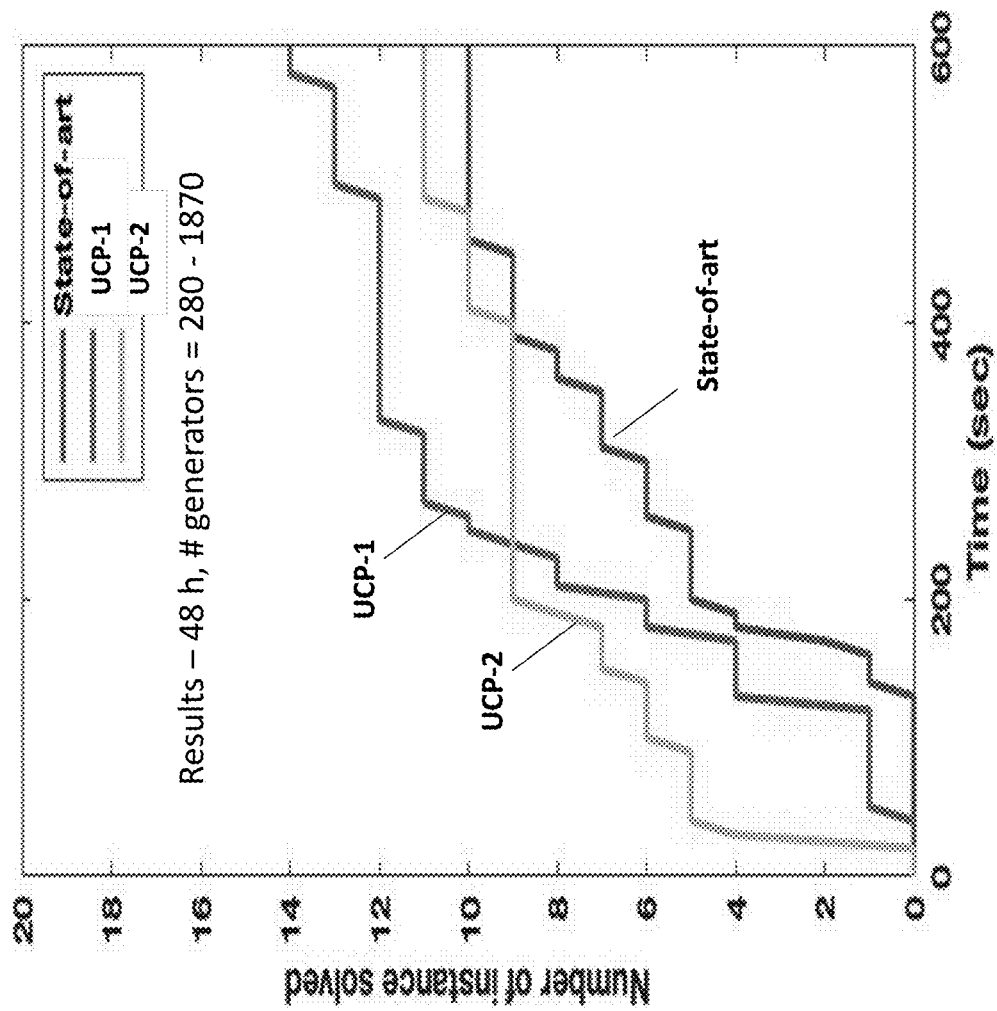
FIG. 11 is an example of computation results performed for a 48-hour operation schedules of a number of power generators 280-1870, according to embodiments of the present invention.

FIG. 11 is an example of computation results performed for a 48-hour operation schedules of a number of power generators 280-1870, indicating a number of instances solved as a function of time consumption, according to embodiments of the present invention. The lines UCP-1 and UCP-2 are based on the decision diagram formulations presented in Eq (UCP-1) and Eq (UCP-2) respectively discussed above, while a label of State-of-art is performed by a conventional unit commitment method. It is seen that enormous computing time reductions are provided by the lines UCP-1 and UCP-2. In other words, the present invention can substantially reduce the computational load and be improvements in computer functionality and improvements in an existing technology regarding computer implementation.

Further, according to embodiments of the present invention, linear objective functions can be optimized over in linear time (with respect to the size of the Decision Diagram) by computing a shortest path, which can lead to orders-of-magnitude improvement gains over other techniques.

Although the invention has been described by way of examples of preferred embodiments, it is to be understood that various other adaptations and modifications can be made within the spirit and scope of the invention.

Therefore, it is the object of the appended claims to cover all such variations and modifications as come within the true spirit and scope of the invention.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

The invention claimed is:

1. A power generation planning system for controlling on/off sequence of generators according to operational parameters, comprising:

an interface to receive the operational parameters including a set of scenarios wherein each scenario includes a demand and reserve pattern, state-data of the generators and operational histories of the generators from a power control system and wherein the operational histories of the generators include an available number of the generators for operations, a time period of operations of the generators, and a reserve power in response to a power demand;

a memory to store an objective function, a mixed-integer programming solver, generator parameters of each the generators and planning modules including a state-space representation module, a variable assignment module, a network flow module and a tight constraint module;

a processor to execute the planning modules based on the operational parameters received by the interface, wherein the processor is configured to construct decision diagrams for each of the generators according to the generator parameters by using the state-space representation module;

generate arc variables representing state transformations of the generators by assigning binary variables to arcs of the decision diagrams by using the variable assignment module and continuous variables for each scenario representing the power production of generators;

generate network flow constraints to represent feasible operations of each of the generators;

generate tight constraints of each of the generators by using the tight constraint module for each scenario and formulate a mixed-integer problem;

solve the mixed-integer problem, by using the mixed-integer programming solver, based on the states-data of the generators, the network flow constraints and the tight constraints; and transmit on/off sequence data of each of the generators obtained from the solved mixed-integer problem to a power control system via the interface;

wherein the power control system controls operation of each of the generators according to the transmitted on/off sequence data.

2. The system of claim 1, wherein the arc variables are state transformation of the generators in the decision diagrams.

3. The system of claim 1, wherein the generator parameters include cost information of each of the generators and start-up patterns and shut-down patterns of the generators for representing minimum up/down time, minimum power/maximum power, ramp up/down rates, start-up/shut-down time.

4. The system of claim 1, wherein the arc variables are created by assigning binary variables to arcs of the decision diagrams by using the variable assignment module.

5. The system of claim 1, wherein the mixed-integer programming solver minimizes the objective function based on the states-data of the generators, the network flow constraints and the tight constraints.

6. The system of claim 1, wherein the operational histories of the generators are updated before performing the planning modules by receiving latest operational histories from the power control system.

7. The system of claim 1, wherein the state-space representation module uses start-up patterns, continuous operation states, shut-down patterns and continuous shut-down states of the generators to construct the decision diagrams.

8. The system of claim 7, wherein each of the start-up patterns, continuous operation states, shut-down patterns and continuous shut-down states of the generators is different.

9. The system of claim 8, wherein a demanded-power-profile is achieved by integrating the start-up patterns, continuous operation states, shut-down patterns and continuous shut-down states of the generators.

10. The system of claim 1, wherein the number of scenarios is one.

11. The system of claim 1, wherein a demanded-power-profile is achieved by integrating the on/off sequence data of each of the generators.

12. A power generation planning system for controlling on/off sequence of generators according to operational parameters, comprising:
   an interface to receive the operational parameters including a set of scenarios wherein each scenario includes a demand and reserve pattern, state-data of the generators and operational histories of the generators from a power control system, and wherein the operational histories of the generators include an available number of the generators, a time period of operations of the generators, and a reserve power in response to a power demand;
   a memory to store an objective function, a mixed-integer programming solver, generator parameters of each the generators and planning modules including a state-space representation module, a variable assignment module, a network flow module and a tight constraint module;
   a processor to execute the planning modules based on the operational parameters received by the interface, wherein the processor is configured to construct decision diagrams for each of the generators according to the generator parameters by using the state-space representation module;
   generate path variables representing the state transformations of the generators using the variable assignment module and continuous variables for each scenario representing the power production of generators;
   generate restricted master problem constraints to represent feasible operations of each of the generators including the tight constraint module for each scenario and formulate a mixed-integer problem;
   solve the mixed-integer problem, by using Branch-and-Price algorithm, based on the states-data of the generators, the restricted master problem constraints including the tight constraints; and
   transmit on/off sequence data of each of the generators obtained from the solved mixed-integer problem to a power control system via the interface;
   wherein the power control system controls operation of each of the generators according to the transmitted on/off sequence data.

13. The system of claim 12, wherein the arc variables are state transformation of the generators in the decision diagrams.

14. The system of claim 12, wherein the generator parameters include cost information of each of the generators and start-up patterns and shut-down patterns of the generators for representing minimum up/down time, minimum power/maximum power, ramp up/down rates, start-up/shut-down time.

15. The system of claim 12, wherein the arc variables are created by assigning binary variables to arcs of the decision diagrams by using the variable assignment module.

16. The system of claim 12, wherein the mixed-integer programming solver minimizes the objective function based on the states-data of the generators, the network flow constraints and the tight constraints.

17. The system of claim 12, wherein the operational histories of the generators are updated before performing the planning modules by receiving latest operational histories from the power control system.

18. The system of claim 12, wherein the state-space representation module uses start-up patterns, continuous operation states, shut-down patterns and continuous shut-down states of the generators to construct the decision diagrams.

19. The system of claim 18, wherein each of the start-up patterns, continuous operation states, shut-down patterns and continuous shut-down states of the generators is different.

20. The system of claim 19, wherein a demanded-power-profile is achieved by integrating the start-up patterns, continuous operation states, shut-down patterns and continuous shut-down states of the generators.

21. The system of claim 12, wherein the number of scenarios is one.

22. The system of claim 12, wherein a demanded-power-profile is achieved by integrating the on/off sequence data of each of the generators.

* * * * *